(12) United States Patent
Aoki et al.

(10) Patent No.: US 7,117,071 B2
(45) Date of Patent: Oct. 3, 2006

(54) HYBRID VEHICLE DRIVE CONTROL APPARATUS, AND CONTROL METHOD OF HYBRID VEHICLE DRIVE APPARATUS AND PROGRAM THEREOF

(75) Inventors: Kazuo Aoki, Anjo (JP); Toshio Okoshi, Anjo (JP); Hiroyuki Kojima, Anjo (JP); Kozo Yamaguchi, Anjo (JP); Ken Iwatsuki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 3 days.

(21) Appl. No.: 10/275,576

(22) PCT Filed: Mar. 7, 2002

(86) PCT No.: PCT/JP02/02123

§ 371 (c)(1),
(2), (4) Date: Mar. 5, 2003

(87) PCT Pub. No.: WO02/072381

PCT Pub. Date: Sep. 19, 2002

(65) Prior Publication Data

US 2004/0045751 A1    Mar. 11, 2004

(30) Foreign Application Priority Data

Mar. 8, 2001  (JP) ............... 2001-65679
Feb. 26, 2002 (JP) ............... 2002-49472

(51) Int. Cl.
*H02P 8/14* (2006.01)
*H02P 8/34* (2006.01)

(52) U.S. Cl. ............ 701/22; 290/40 A; 180/65.4

(58) Field of Classification Search ......... 701/22, 701/65, 113; 290/40 A, 40 B, 40 C, 40 E, 290/40 F; 477/3, 15, 46; 180/65.4
See application file for complete search history.

(56) References Cited

U.S. PATENT DOCUMENTS

| | | | |
|---|---|---|---|
| 5,959,420 A * | 9/1999 | Boberg et al. | 318/432 |
| 6,018,694 A | 1/2000 | Egami et al. | |
| 6,090,007 A * | 7/2000 | Nakajima et al. | 477/46 |
| 6,104,166 A * | 8/2000 | Kikuchi et al. | 320/132 |
| 6,233,508 B1 * | 5/2001 | Deguchi et al. | 701/22 |
| 6,253,127 B1 * | 6/2001 | Itoyama et al. | 701/22 |
| 6,328,671 B1 * | 12/2001 | Nakajima et al. | 477/46 |
| 6,356,817 B1 * | 3/2002 | Abe | 701/22 |
| 6,441,574 B1 * | 8/2002 | Phillips et al. | 318/432 |
| 6,507,127 B1 * | 1/2003 | Amano et al. | 290/40 C |

FOREIGN PATENT DOCUMENTS

| | | |
|---|---|---|
| JP | 1-126104 | 5/1989 |
| JP | 4-207908 | 7/1992 |
| JP | 10-150703 | 6/1998 |
| JP | 10-070801 | 10/1998 |
| JP | 11-252709 | 9/1999 |
| JP | 2001-095106 | 6/2001 |

\* cited by examiner

*Primary Examiner*—Dalena Tran
(74) *Attorney, Agent, or Firm*—Oliff & Berridge, PLC

(57) ABSTRACT

A hybrid vehicle drive apparatus including an electric power generator mechanically connected to the engine, a drive motor driven by at least one of an electric current generated by the electric power generator and an electric current supplied from a battery; a detector that detects a battery state of the battery and a controller that sets a target torque of the drive motor based on the battery state.

25 Claims, 20 Drawing Sheets

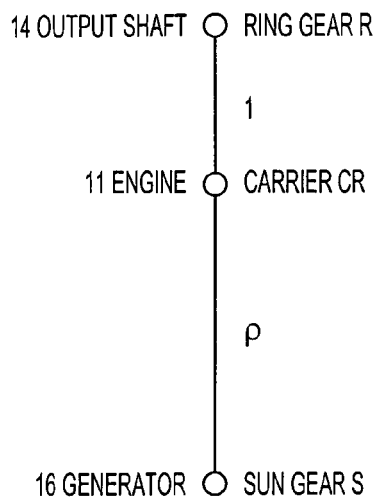
Fig. 3
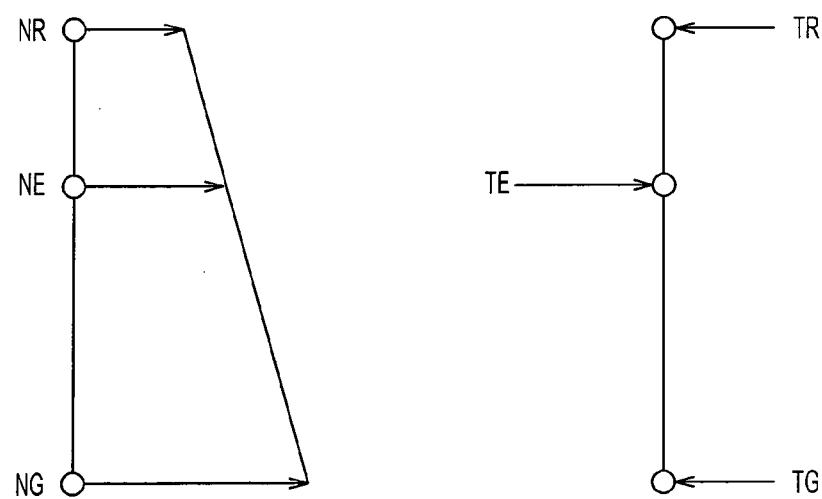
Fig. 4
Fig. 5

HYBRID VEHICLE DRIVE CONTROL APPARATUS, AND CONTROL METHOD OF HYBRID VEHICLE DRIVE APPARATUS AND PROGRAM THEREOF

1. FIELD OF INVENTION

The invention relates to a hybrid vehicle drive control apparatus, a control method of a hybrid vehicle drive apparatus and a program thereof.

2. DESCRIPTION OF RELATED ART

In a conventional hybrid vehicle designed so as to transfer torque of an engine, that is, a portion of the torque of the engine, to an electric power generator (generator-motor), and transfer the rest of the torque to drive wheels, a planetary gear unit having a sun gear, a ring gear and a carrier is provided. The hybrid vehicle connects the carrier and the engine, and connects the ring gear and drive wheels, and connects the sun gear and the generator so that the rotation output from the drive motor and the ring gear is transferred to the drive wheels so as to generate the drive force.

In this type of hybrid vehicle, the torque of the drive motor, that is, the drive motor torque, is greater than the engine torque during a region in which the rotational speed of the drive motor, that is, the drive motor rotational speed is low. Therefore, when starting the vehicle, only the drive motor is driven and the driving of the engine is stopped, that is, the hybrid vehicle is run in a motor drive mode. Therefore, a generator is passively turned. If, after the start, the vehicle speed reaches an engine startup vehicle speed that is suitable to start the engine, the generator is driven to increase the rotational speed of the engine, that is, the engine rotational speed, to a rotational speed suitable for ignition, and the engine is started. After that, the drive motor and the engine are driven. Thus, the hybrid vehicle is run in a motor-engine drive mode. After that, the torque of the generator, that is, the generator torque, is controlled so as to generate a reaction force that is needed in order to support the engine torque.

SUMMARY OF THE INVENTION

In this case, if in the hybrid vehicle, the accelerator pedal is greatly depressed to cause a sharp acceleration, the drive motor torque increases, and the current supplied to the drive motor increases, and therefore, the battery voltage sharply reduces. In this case, the maximum torque of the generator decreases as the battery voltage decreases. Therefore, if the battery voltage sharply reduces with a sharp acceleration, the generator torque reduces so that the engine torque cannot be supported. As a result, the engine races, and the engine rotational speed sharply rises. Therefore, the racing of the engine is prevented by reducing the engine torque when sharp acceleration is performed.

In the conventional hybrid vehicles, however, if the engine torque is reduced, the engine is driven at a point that is apart from an optimal fuel economy curve, thus causing a low engine efficiency and, furthermore, degrading a state of exhaust gas.

Furthermore, if the engine torque is reduced, the amount of electric power generated by the generator reduces, and therefore, the drive motor torque correspondingly reduces. Therefore, the overall output of the hybrid vehicle becomes small.

The invention thus solves the problems of the conventional hybrid vehicle. The invention thus provides a hybrid vehicle drive control apparatus, a control method of the hybrid vehicle drive apparatus, and a program thereof which are capable of preventing the engine from racing at the time of a sharp acceleration of the vehicle and therefore preventing a degraded state of exhaust gas, and therefore increasing the overall output.

Therefore, a hybrid vehicle drive control apparatus according to an exemplary aspect of the invention includes an electric power generator mechanically connected to an engine, a drive motor driven by at least one of an electric current generated by the electric power generator and an electric current supplied from a battery, a detector that detects a battery state of the battery and a controller that sets a target torque of the drive motor based on the battery state.

In a control method of a hybrid vehicle drive apparatus of the invention, an electric current is generated by an electric power generator mechanically connected to an engine, a drive motor is driven by at least one of the electric current generated by the electric power generator and an electric current supplied from a battery, a battery state of the battery is detected, and a target torque of the drive motor is set based on the battery state.

A program of a control method of a hybrid vehicle drive apparatus of the invention is applied to a control method of a hybrid vehicle drive apparatus which includes an electric power generator mechanically connected to an engine, a drive motor driven by at least one of an electric current generated by the electric power generator and an electric current supplied from the battery, and a detector that detects a battery state of the battery. Then, a computer functions as target drive motor torque setting means for setting a target torque of the drive motor based on the battery state.

BRIEF DESCRIPTION OF THE DRAWING

The foregoing and further objects, features and advantages of the invention will become apparent from the following description of preferred embodiments with reference to the accompanying drawings, wherein like numerals are used to represent like elements and wherein;

FIG. 3 is a diagram illustrating an operation of a planetary gear unit in the first embodiment of the invention;

FIG. 4 is a speed diagram for a normal run of the vehicle in the first embodiment of the invention;

FIG. 5 is a torque diagram for a normal run in the first embodiment of the invention;

DETAILED DESCRIPTION OF PREFERRED EMBODIMENTS

Embodiments of the invention will be described in detail hereinafter with reference to the drawings. In this case, the description is given of a hybrid vehicle drive control apparatus applied to a hybrid vehicle, and a control method of a hybrid vehicle drive apparatus.

Figure 1:
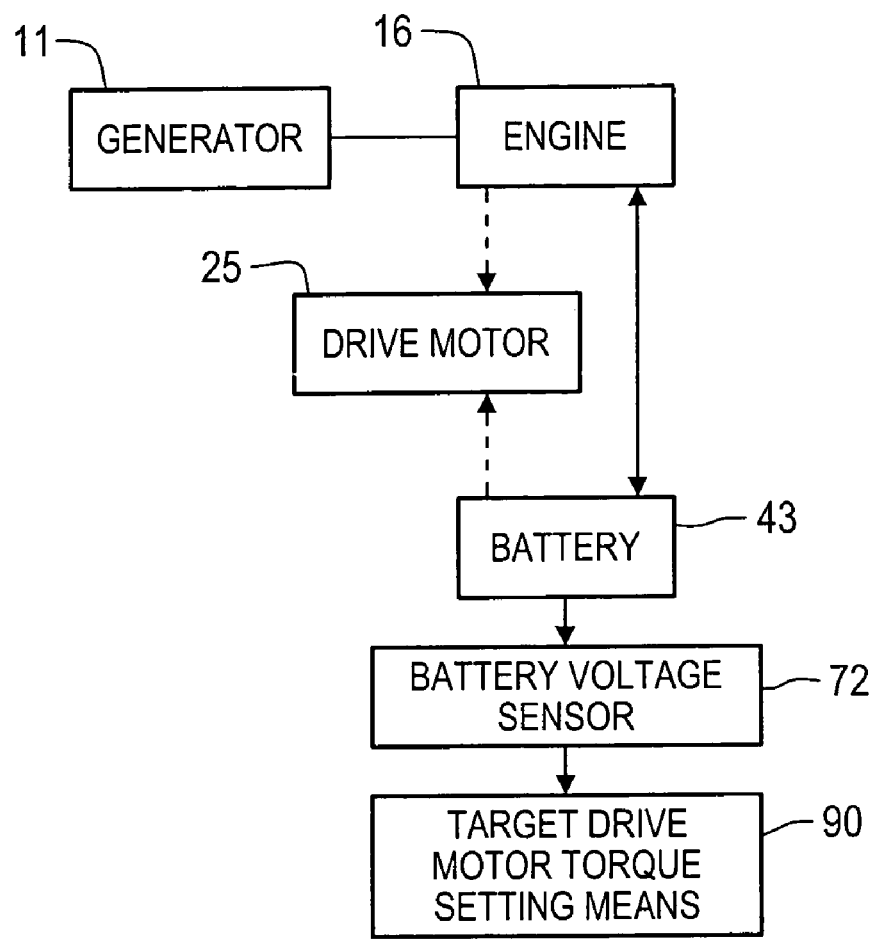
FIG. 1 is a function block diagram of a hybrid vehicle drive control apparatus in accordance with a first embodiment of the invention.

FIG. 1 is a function block diagram of a hybrid vehicle drive control apparatus in accordance with a first embodiment of the invention.

In the drawing, reference numeral 16 represents an electric power generator mechanically connected to an engine 11, 25 represents a drive motor driven by at least one of the current generated by the generator 16 and the current supplied from a battery 43, 72 represents a battery voltage sensor provided as battery state detecting means for detecting the battery state of the battery 43, and 90 represents target drive motor torque setting means for setting a target value of the drive motor.

Figure 2:
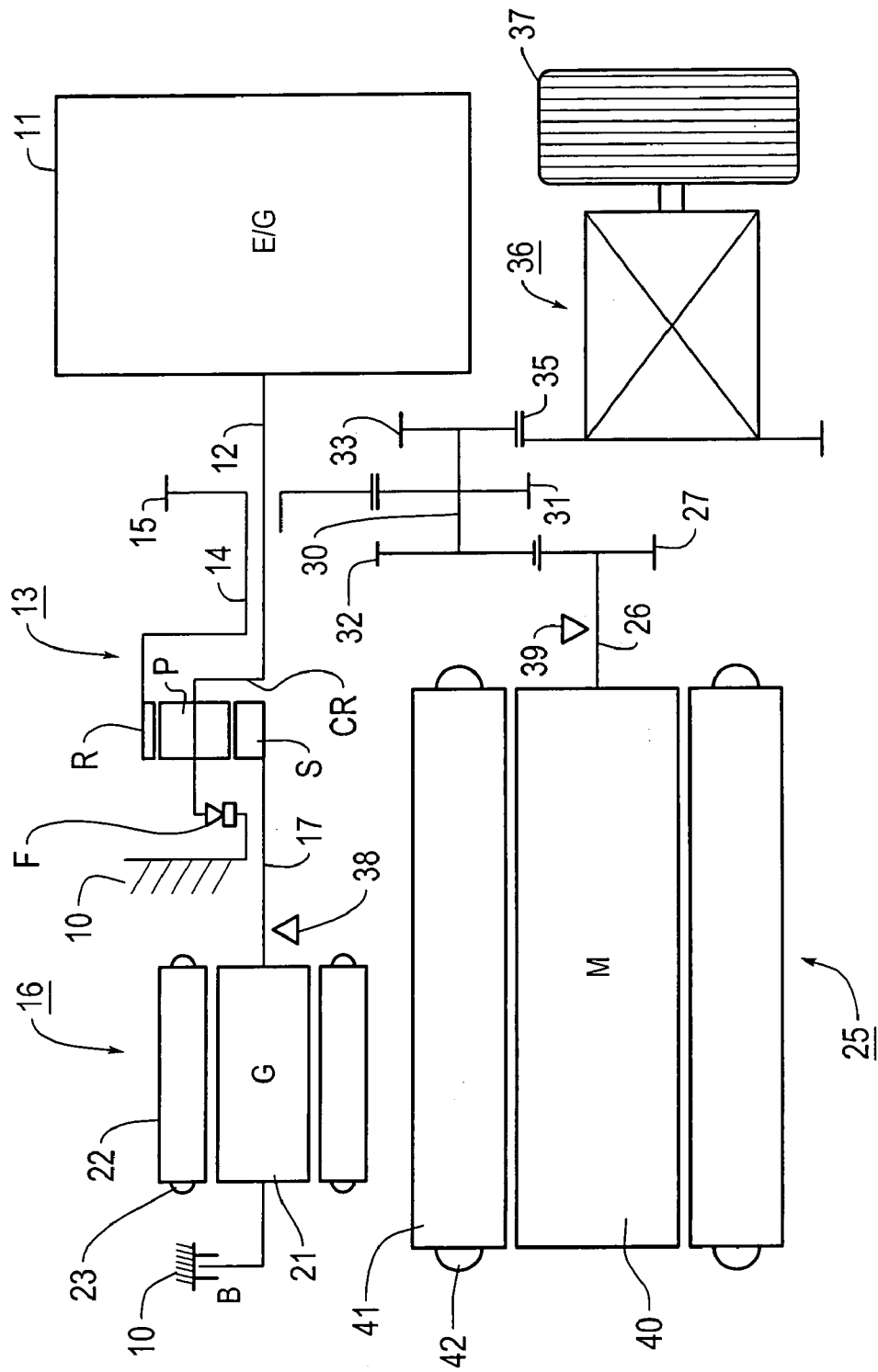
FIG. 2 is a conceptual diagram of a hybrid vehicle in accordance with the first embodiment of the invention.

FIG. 2 is a conceptual diagram of a hybrid vehicle in accordance with the first embodiment of the invention.

In the drawing, reference numeral 1 represents an engine (E/G) disposed on a first axis, and 12 represents an output shaft that is disposed on the first axis and that outputs rotation generated by driving the engine 11, and 13 represents a planetary gear unit as a differential gear unit that is disposed on the first axis and that changes the speed of rotation input via the output shaft 12, and 14 represents an output shaft that is disposed on the first axis and that outputs rotation after the speed is changed by the planetary gear unit 13, and 15 represents a first counter drive gear as an output gear that is fixed to the output shaft 14, and 16 represents an electric power generator (G) as a first electric motor that is disposed on the first axis and that is connected to the planetary gear unit 13 via a transfer shaft 17 and is mechanically connected to the engine 11.

The output shaft 14 has a sleeve shape, and is disposed so as to surround the output shaft 12. Further, the first counter drive gear 15 is disposed at an engine 11 side of the planetary gear unit 13.

Further, the planetary gear unit 13 has at least a sun gear S as a first gear element, pinions P meshed with the sun gear S, a ring gear R as a second gear element meshed with the pinions P, and a carrier CR as a third gear element that rotatably supports the pinions P. The sun gear S is connected to the generator 16 via the transfer shaft 17. The ring gear R is connected to drive wheels 37 and a drive motor (M) 25 as a second electric motor disposed on a second axis parallel to the first axis, via the output shaft 14 and a certain gear train. The carrier CR is connected to the engine 11 via the output shaft 12. The drive motor 25 and the generator 16 are mechanically connected to each other. Further, a one-way clutch F is disposed between the carrier CR and a case 10 of a drive device. The one-way clutch F becomes free when forward rotation is transferred from the engine 11 to the carrier CR. When reverse rotation is transferred from the generator 16 or the drive motor 25 to the carrier CR, the one-way clutch F is locked so as to prevent transfer of reverse rotation to the engine 11.

The generator 16 is formed by a rotor 21 that is fixed to the transfer shaft 17 and that is rotatably disposed, a stator 22 that is disposed around the rotor 21, and a coil 23 that is wound on the stator 22. The generator 16 generates electric power based on rotations transferred thereto via the transfer shaft 17. The coil 23 is connected to a battery (not shown), and supplies DC current to the battery. A generator brake B is disposed between the rotor 21 and the case 10. By engaging the generator brake B, the rotor 21 can be fixed, that is, rotation of the generator 16 can be stopped.

Further, reference numeral 26 represents an output shaft which is disposed on the second axis and to which rotation of the drive motor 25 is output, and 27 represents a second counter drive gear as an output gear fixed to the output shaft 26. The drive motor 25 is formed by a rotor 40 that is fixed to the output shaft 26 and that is rotatably disposed, a stator 41 that is disposed around the rotor 40, and a coil 42 that is wound on the stator 41.

The drive motor 25 generates drive motor torque based on current supplied to the coil 42. Therefore, the coil 42 is connected to the battery, so that the coil 42 is supplied with AC current converted from DC current from the battery.

Further, in order to rotate the drive wheels 37 in the same direction as rotation of the engine 11, a counter shaft 30 is disposed on a third axis parallel to the first and second axes. A first counter driven gear 31, and a second counter driven gear 32 having more teeth than the first counter driven gear 31 are fixed to the counter shaft 30. The first counter driven gear 31 and the first counter drive gear 15 are meshed, and the second counter driven gear 32 and the second counter drive gear 27 are meshed. Thus, rotation of the first counter drive gear 15 is reversed and transferred to the first counter driven gear 31, and rotation of the second counter drive gear 27 is reversed and transferred to the second counter driven gear 32. Furthermore, a differential pinion gear 33 having fewer teeth than the first counter driven gear 31 is fixed to the counter shaft 30.

A differential device 36 is disposed on a fourth axis parallel to the first to third axes. A differential ring gear 35 of the differential device 36 is meshed with the differential pinion gear 33. Therefore, rotation transferred to the differential ring gear 35 is distributed and transferred to the drive wheels 37 by the differential device 36. Thus, the transfer of rotation generated by the drive motor 25 to the second counter driven gear 32 as well as the transfer of rotation of generated by the engine 11 to the first counter driven gear 31 can be accomplished. Therefore, by driving the engine 11 and the drive motor 25, the hybrid vehicle can be driven.

In this case, reference numeral 38 represents a generator rotor position sensor, such as a resolver or the like, which detects the position of the rotor 21, that is, the generator rotor position $\theta G$, and 39 represents a drive motor rotor position sensor, such as a resolver or the like, which detects the position of the rotor 40, that is, the drive motor rotor position $\theta M$.

By computing a changing rate $\Delta\theta G$ of the generator rotor position $\theta G$, the rotational speed of the generator 16, that is, the generator rotational speed NG, is detected. By computing a changing rate $\Delta\theta M$ of the drive motor rotor position $\theta M$, the rotational speed of the drive motor 25, that is, the drive motor rotational speed NM, is detected. Furthermore, a vehicle speed V can be computed based on the changing rate $\Delta\theta M$, and the gear ratio $\gamma V$ of a torque transfer system from the output shaft 26 to the drive wheels 37. In this case, the generator rotor position $\theta G$ corresponds to the generator rotational speed NG, and the drive motor rotor position $\theta M$ corresponds to the drive motor rotational speed NM and the vehicle speed V. Therefore, it is possible to cause the generator rotor position sensor 38 to function as generator rotational speed detecting means for detecting the generator rotational speed NG, and to cause the drive motor rotor position sensor 39 to function as a drive motor rotational speed detecting means for detecting the drive motor rotational speed NM and vehicle speed detecting means for detecting the vehicle speed V.

Next described will be an operation of the planetary gear unit 13. FIG. 3 is a diagram illustrating an operation of the planetary gear unit in the first embodiment of the invention. FIG. 4 is a speed diagram for a normal run of the vehicle in the first embodiment of the invention. FIG. 5 is a torque diagram for a normal run in the first embodiment of the invention.

In the planetary gear unit 13, the carrier CR is connected to the engine 11, and the sun gear S is connected to the generator 16, and the ring gear R is connected to the drive motor 25 and the drive wheels 37 via the output shaft 14. Therefore, the rotational speed of the ring gear R, that is, the ring gear rotational speed NR, is equal to the rotational speed output to the output shaft 14, that is, the output shaft rotational speed, and the rotational speed of the carrier CR is equal to the engine rotational speed NE, and the rotational speed of the sun gear S is equal to the generator rotational speed NG. If the number of teeth of the ring gear R is $\rho$ times (twice in this embodiment) the number of the teeth of the sun gear S, the following relationship is established:

$$(\rho+1) \cdot NE = 1 \cdot NG + \rho \cdot NR$$

Therefore, the engine rotational speed NE can be computed based on the ring gear rotational speed NR and the generator rotational speed NG as in:

$$NE = (1 \cdot NG + \rho \cdot NR)/(\rho+1) \qquad (1)$$

The expression (1) forms a rotational speed relational expression of the planetary gear unit 13.

Further, the engine torque TE, the torque generated on the ring gear R, that is, the ring gear torque TR, and the generator torque TG have the following relationship:

$$TE:TR:TG = (\rho+1):\rho:1 \qquad (2)$$

Therefore, the reaction forces are applied to each other. In this case, the expression (2) forms a torque relational expression of the planetary gear unit 13.

Further, during a normal run of the hybrid vehicle, all of the ring gear R, the carrier CR and the sun gear S are forwardly rotated, and all of the ring gear rotational speed NR, the engine rotational speed NE and the generator rotational speed NG assume positive values as indicated in FIG. 4. Furthermore, the ring gear torque TR and the generator torque TG are obtained by proportionally splitting the engine torque TE by the torque ratio determined by the numbers of the teeth of the planetary gear unit 13. Therefore, in the torque diagram of FIG. 5, the sum of the ring gear torque TR and the generator torque TG equals the engine torque TE.

Figure 6:
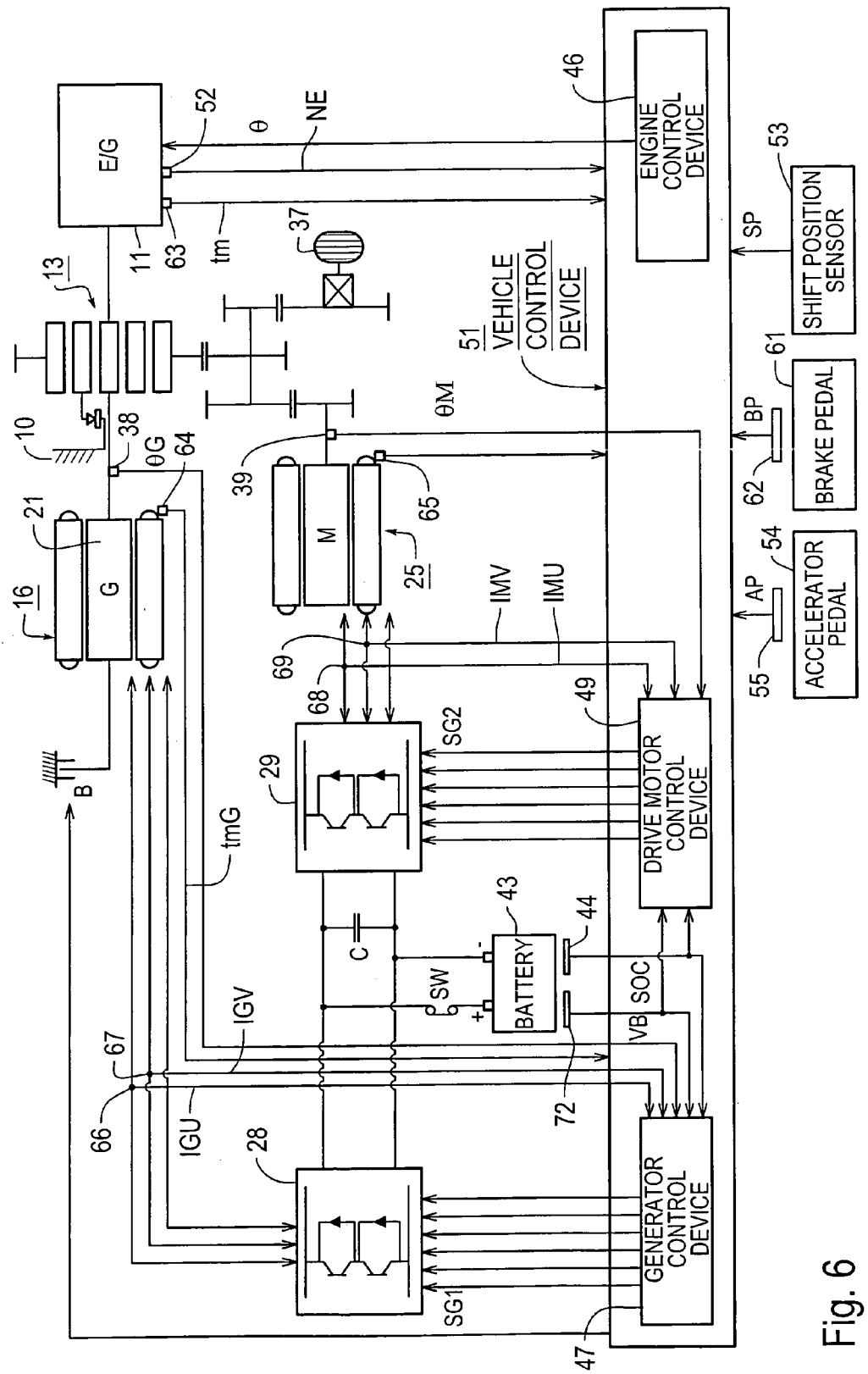
FIG. 6 is a conceptual diagram illustrating the hybrid control vehicle drive control apparatus in the first embodiment of the invention.

Next described will be a hybrid vehicle drive control apparatus constructed as described above. FIG. 6 is a conceptual diagram illustrating a hybrid vehicle drive control apparatus in the first embodiment of the invention.

In the drawing, reference numeral 10 represents the case, 11 represents the engine, 13 represents the planetary gear unit, 16 represents the generator, reference symbol B represents the generator brake for fixing the rotor 21 of the generator 16, reference numeral 25 represents the drive motor, 28 represents an inverter for driving the generator 16, 29 represents an inverter for driving the drive motor 25, 37 represents the drive wheel, 38 represents the generator rotor position sensor, 39 represents the drive motor rotor position sensor, and 43 represents the battery that stores electric power. The inverters 28 and 29 are connected to the battery 43 via a power switch SW. When the power switch SW is on, the battery 43 feeds DC current to the inverters 28 and 29. In this case, a smoothing capacitor C is connected between a positive polarity terminal and a negative polarity terminal of the battery 43. Further, the generator 16, the inverter 28 and a cooling system (not shown) form an electricity generation and drive portion. The drive motor 25 is driven by at least one of the current generated by the generator 16 and the current supplied from the battery 43.

Further, reference numeral 51 represents a vehicle control apparatus that is formed by a CPU, a record device, etc. (not shown) and that performs overall control of the hybrid vehicle. The vehicle control apparatus 51 includes an engine control device 46 as engine control means, a generator control device 47 as generator control means, and a drive motor control device 49 as drive motor control means. Further, the engine control device 46 is formed by a CPU, a record device, etc. (not shown), and sends instruction signals regarding the degree of throttle opening $\theta$, the valve timing, etc., to the engine 11 in order to control the engine 11. Further, the generator control device 47 is formed by a CPU, a record device, etc. (not shown), and sends a drive signal SG1 to the inverter 28 in order to control the generator 16. Further, the drive motor control device 49 sends a drive signal SG2 to the inverter 29 in order to control the drive motor 25. The vehicle control apparatus 51, the engine control device 46, the generator control device 47 and the drive motor control device 49 function as a computer based on a predetermined program, data and the like.

The inverter 28 is driven based on the drive signal SG1. During powering (drive), the inverter 28 receives DC current from the battery 43, and generates currents IGU, IGV and IGW of a U phase, a V phase and a W phase, and supplies the currents IGU, IGV, IGW to the generator 16. During regeneration (electric power generation), the inverter 28 receives currents IGU, IGV and IGW from the generator 16, and generates DC current, and supplies the current to the battery 43.

The inverter 29 is driven based on the drive signal SG2. During powering, the inverter 29 receives DC current from the battery 43, and generates currents IMU, IMV and IMW of the U phase, the V phase and the W phase, and supplies the currents IMU, IMV and IMW to the drive motor 25. During regeneration, the inverter 29 receives the currents IMU, IMV and IMW from the drive motor 25, generates DC current, and supplies the current to the battery 43.

Further, reference numeral 44 represents a battery remaining charge detecting device that detects the state of the battery 43, that is, the battery remaining charge SOC as a battery state, reference numeral 52 represents an engine rotational speed sensor that detects the engine rotational speed NE, reference numeral 53 represents a shift position sensor that detects the position of a shift lever as speed selection operating means (not shown), that is, the shift position SP, reference numeral 54 represents an accelerator pedal, reference numeral 55 represents an accelerator switch as accelerator operation detecting means for detecting the position of the accelerator pedal 54 (amount of depression), that is, the accelerator pedal position AP, reference numeral 61 represents a brake pedal, reference numeral 62 represents a brake switch as brake operation detecting means for detecting the position of the brake pedal 61 (amount of depression), that is, the brake pedal position BP, reference numeral 63 represents an engine temperature sensor for detecting the temperature tm of the engine 11, reference numeral 64 represents a generator temperature sensor as generation-drive portion temperature detecting means for detecting the temperature of the generator 16, for example, the temperature of the coil 23 (FIG. 2), and reference numeral 65 represents a drive motor temperature sensor for detecting the temperature of the drive motor 25, for example, the temperature of the coil 42. In this case, an inverter temperature sensor for detecting the temperature of the inverter 28, an oil temperature sensor for detecting the temperature of oil in the cooling system, etc. may be used as generation-drive portion temperature detecting means.

Further, reference numerals 66 to 69 respectively represent current sensors that detect the currents IGU, IGV, IMU, IMV, and reference numeral 72 represents a battery voltage sensor that detects the battery voltage VB as the battery state and a direct electric voltage. Further, it is also possible to detect a direct electric voltage in an inlet side of the inverter 29 as the battery state and the direct electric voltage, by an inverter inlet electric voltage sensor (not shown). In this case, the battery state detecting means and the direct electric voltage detecting portion are constituted by the battery voltage sensor 72, the inverter inlet voltage sensor and the like.

The vehicle control apparatus 51 sends an engine control signal to the engine control device 46 to drive and stop the engine 11, and inputs the generator rotor position $\theta G$ to compute the generator rotational speed NG, and inputs the drive motor rotor position $\theta M$ to compute the drive motor rotational speed NM, and computes the engine rotational speed NE based on the aforementioned rotational speed relational expression, and sets a target value of the engine rotational speed NE, that is, a target engine rotational speed NE*, in the engine control device 46, and sets a target value of the generator rotational speed NG, that is, a target generator rotational speed NG*, and a target value of the generator torque TG, that is, a target generator torque TG*, in the generator control device 47, and sets a target value of the drive motor torque TM, that is, a target drive motor torque TM*, and a drive motor torque correction value $\delta TM$ in the drive motor control device 49.

Therefore, the generator rotational speed computing means (not shown) of the vehicle control apparatus 51 performs the generator rotational speed computing operation so as to input the generator rotor position $\theta G$ and compute the generator rotational speed NG. The drive motor rotational speed computing means (not shown) of the vehicle control apparatus 51 performs the drive motor rotational speed computing operation so as to input the drive motor rotor position $\theta M$ and compute the drive motor rotational speed NM. The engine rotational speed computing means (not shown) of the vehicle control apparatus 51 performs the engine rotational speed computing operation so as to compute the engine rotational speed NE in accordance with the aforementioned rotational speed relational expression. In this case, the generator rotational speed computing means, the drive motor rotational speed computing means and the engine rotational speed computing means function as generator rotational speed detecting means, drive motor rotational speed detecting means and engine rotational speed detecting means for detecting the generator rotational speed NG, the drive motor rotational speed NM and the engine rotational speed NE, respectively.

Although in this embodiment, the engine rotational speed NE is computed by the vehicle control apparatus 51, the engine rotational speed NE may be input from the engine rotational speed sensor 52. Furthermore, although in this embodiment, the vehicle speed V is computed based on the drive motor rotor position $\theta M$, the vehicle speed V may be computed based on a ring gear rotational speed NR which has been detected, or may be computed based on the rotational speed of the drive wheels 37, that is, the drive wheel rotational speed. In that case, a ring gear rotational speed sensor, a drive wheel rotational speed sensor, or the like is disposed as vehicle speed detecting means.

Figure 7:
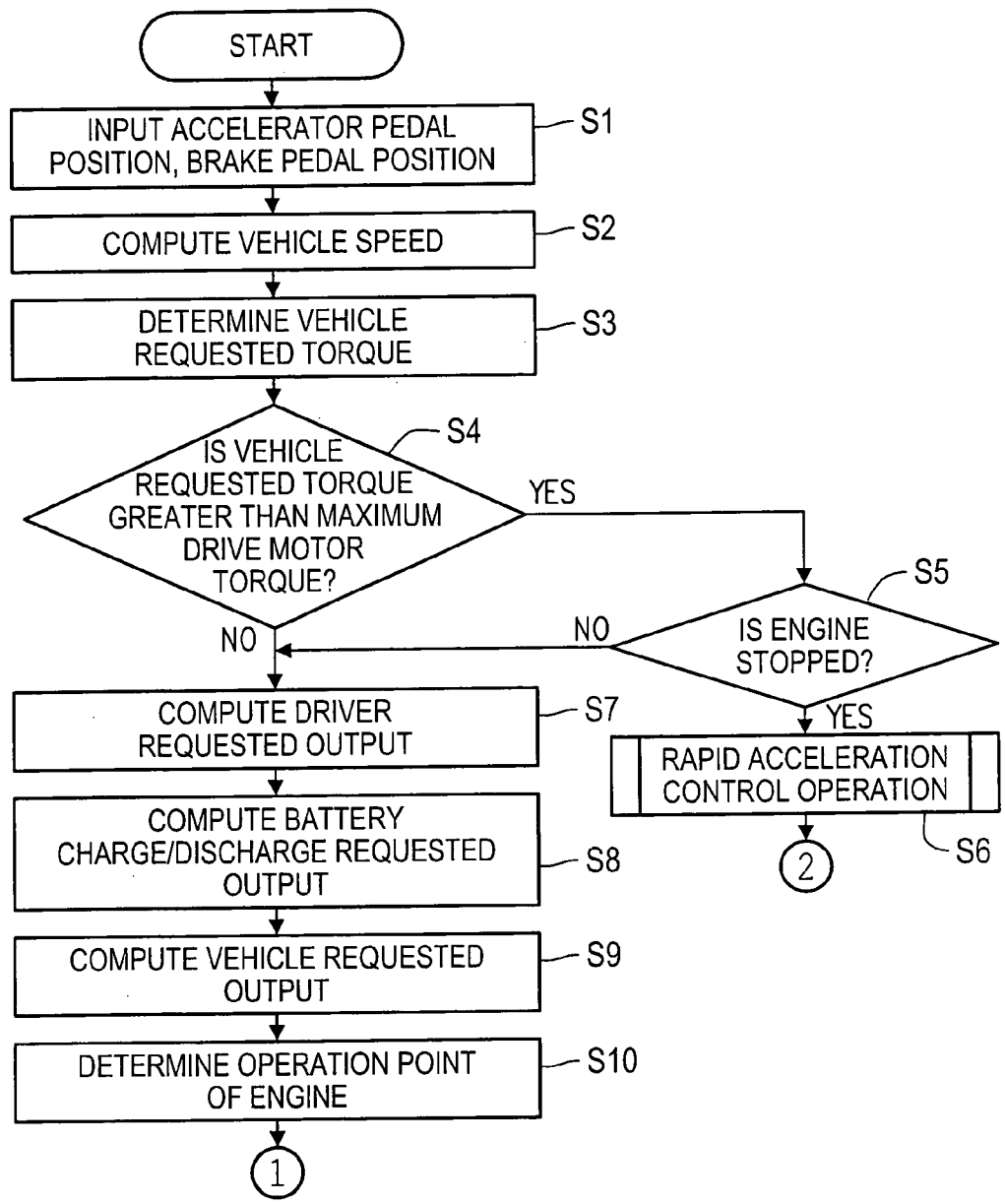
FIG. 7 is a first main flowchart illustrating an operation of the hybrid vehicle in accordance with the first embodiment of the invention.
Figure 8:
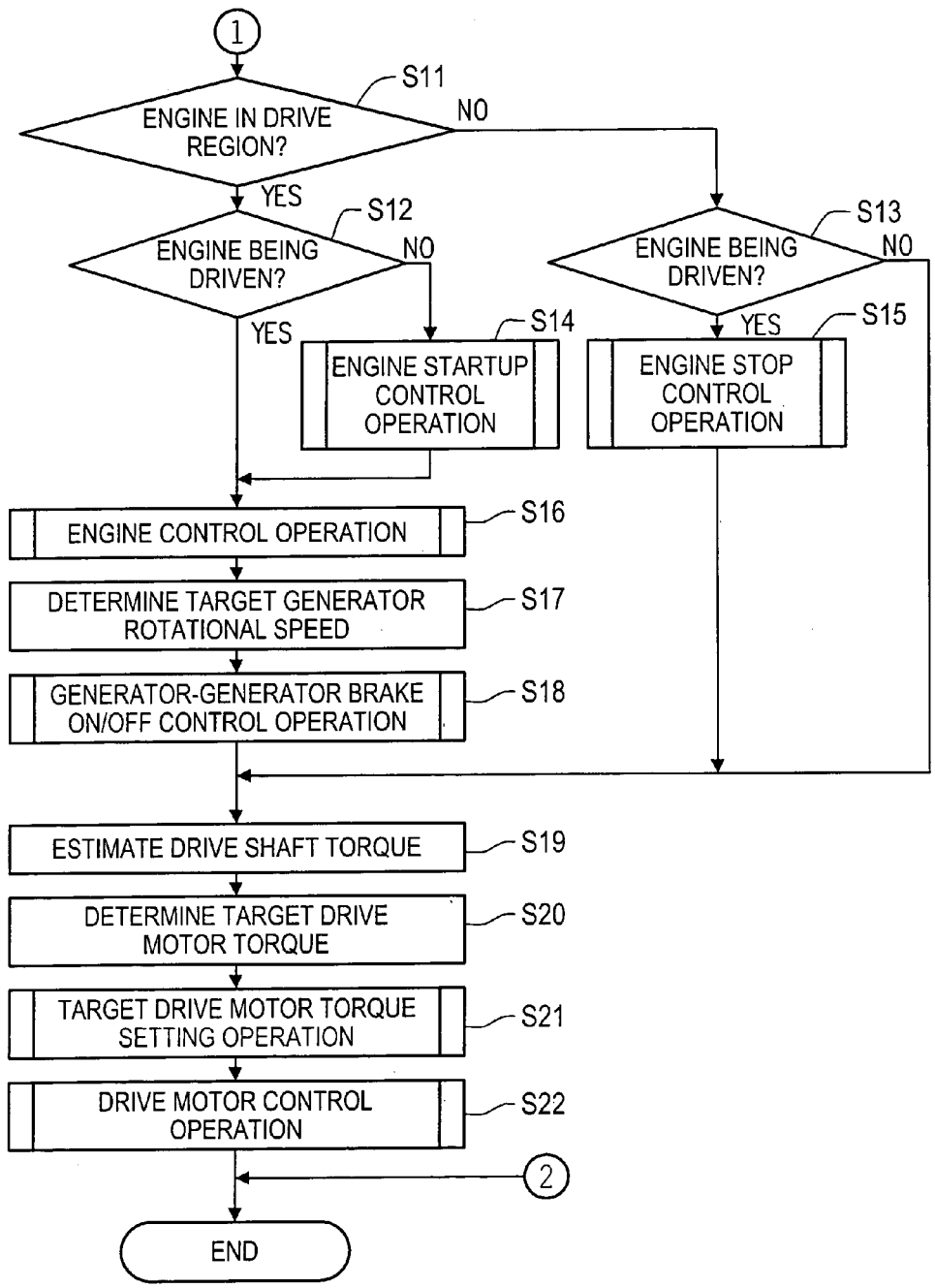
FIG. 8 is a second main flowchart illustrating an operation of the hybrid vehicle in the first embodiment of the invention.
Figure 9:
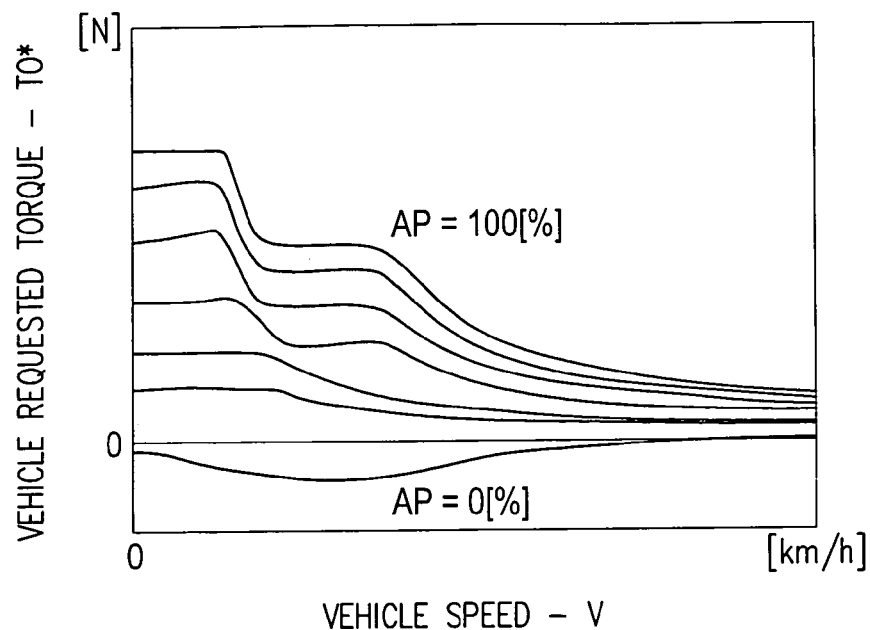
FIG. 9 is a diagram indicating a first vehicle requested torque map in the first embodiment of the invention.
Figure 10:
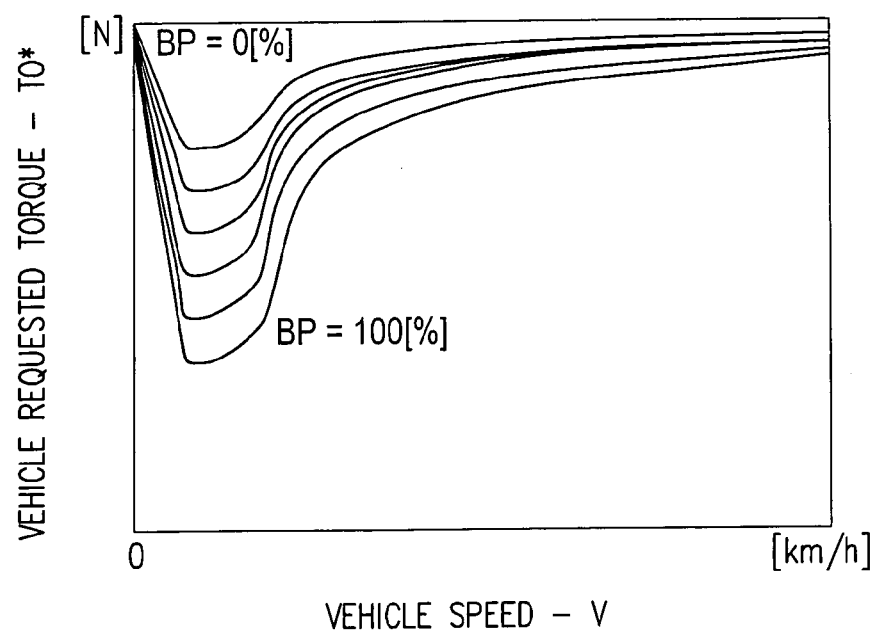
FIG. 10 is a diagram indicating a second vehicle requested torque map in the first embodiment of the invention.
Figure 11:
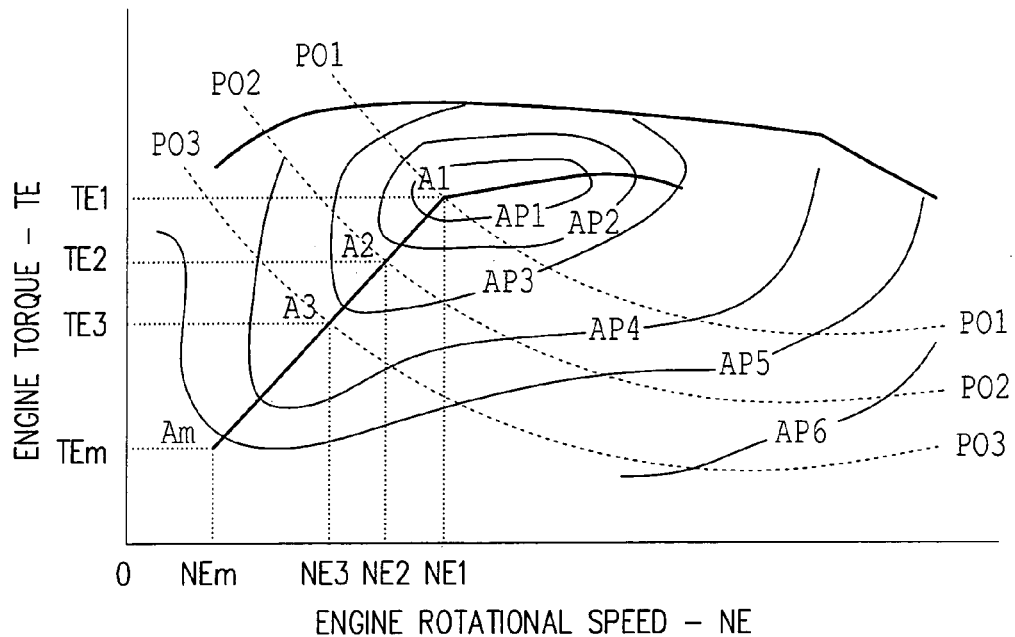
FIG. 11 is a diagram indicating a target engine operation state map in the first embodiment of the invention.
Figure 12:
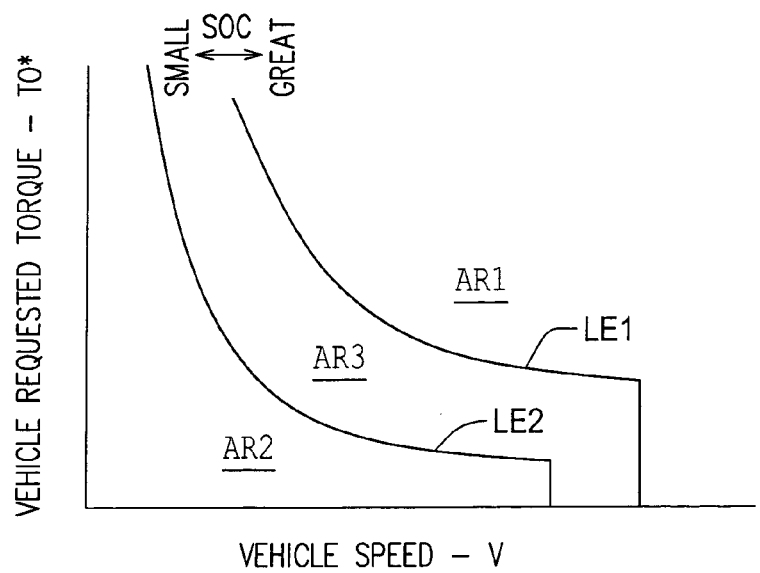
FIG. 12 is an engine drive region map in the first embodiment of the invention.

Next described will be an operation of the hybrid vehicle constructed as described above. FIG. 7 is a first main flowchart illustrating an operation of the hybrid vehicle in accordance with the first embodiment of the invention. FIG. 8 is a second main flowchart illustrating an operation of the hybrid vehicle in the first embodiment of the invention. FIG. 9 is a diagram indicating a first vehicle requested torque map in the first embodiment of the invention. FIG. 10 is a diagram indicating a second vehicle requested torque map in the first embodiment of the invention. FIG. 11 is a diagram indicating a target engine operation state map in the first embodiment of the invention. FIG. 12 is an engine drive region map in the first embodiment of the invention. In FIGS. 9, 10 and 12, the horizontal axis indicates the vehicle speed V, and the vertical axis indicates the vehicle requested torque TO*. In FIG. 11, the horizontal axis indicates the engine rotational speed NE, and the vertical axis indicates the engine torque TE.

First, vehicle requested torque determining means (not shown) of the vehicle control apparatus 51 (FIG. 6) performs a vehicle requested torque determining operation. That is, torque determining the means inputs the accelerator pedal position AP from the accelerator switch 55, and the brake pedal position BP from the brake switch 62, and inputs the drive motor rotor position θM from the drive motor rotor position sensor 39 to compute the vehicle speed V. The means torque determining determines a vehicle requested torque TO* needed to run the hybrid vehicle which has been set beforehand according to the accelerator pedal position AP, the brake pedal position BP and the vehicle speed V, by referring to the first vehicle requested torque map of FIG. 9 recorded in a record device of the vehicle control apparatus 51 if the accelerator pedal 54 is depressed, or by referring to the second vehicle requested torque map of FIG. 10 recorded in the record device if the brake pedal 61 is depressed.

Subsequently, the vehicle control apparatus 51 determines whether the vehicle requested torque TO* is greater than a maximum drive motor torque TMmax pre-set as a rating of the drive motor 25. If the vehicle requested torque TO* is greater than the maximum drive motor torque TMmax, the vehicle control apparatus 51 determines whether the engine 11 is at a stop. If the engine 11 is being stopped, rapid acceleration control means (not shown) of the vehicle control apparatus 51 performs a rapid acceleration control operation, and drives the drive motor 25 and the generator 16 to run the hybrid vehicle.

Further, if the vehicle requested torque TO* is less than or equal to the maximum drive motor torque TMmax, or if the vehicle requested torque TO* is greater than the maximum drive motor torque TMmax and the engine 11 is being driven (is not being stopped), driver requested output computing means (not shown) of the vehicle control apparatus 51 computes a driver requested output PD by multiplying the vehicle requested torque TO* and the vehicle speed V as follows.

$$PD = TO^* \cdot V$$

Next, battery charge/discharge requested output computing means (not shown) of the vehicle control apparatus 51 performs a battery charge/discharge requested output computing operation so as to input the battery remaining charge SOC from the battery remaining charge detecting device 44, and computes a battery charge/discharge requested output PB based on the battery remaining charge SOC.

Subsequently, vehicle requested output computing means (not shown) of the vehicle control apparatus 51 performs a vehicle requested output computing operation so as to compute a vehicle requested output PO by summing the driver requested output PD and the battery charge/discharge requested output PB as in:

$$PO = PD + PB$$

Subsequently, target engine operation state setting means (not shown) of the vehicle control apparatus 51 performs a target engine operation state setting operation. That is, with reference to the target engine operation state map of FIG. 11 recorded in the record device, the target engine operation state setting means determines points A1 to A3, Am at which lines P01 to P03 indicating the vehicle requested output PO intersect an optimal fuel economy curve on which the efficiency of the engine 11 with the accelerator pedal positions AP1 to AP6 becomes highest, as operation points of the engine 11, that is, the target engine operation state. The means determines the engine torques TE1 to TE3 and TEm at the operation points, as target engine torques TE*, and determines the engine rotational speeds NE1 to NE3 and NEm at the operation points as target engine rotational speeds NE*.

Further, the vehicle control apparatus 51 determines whether the engine 11 is in a drive region with reference to the engine drive region map of FIG. 12 recorded in the record device. In FIG. 12, reference symbol AR1 indicates a drive region in which the engine 11 is driven, and AR2 indicates a stop region in which the driving of the engine 11 is stopped, and AR3 indicates a hysteresis region. Furthermore, reference symbol LE1 indicates a line on which the engine 11 in a drive stopped state is driven, and LE2 indicates a line on which the driving of the engine 11 is stopped. The line LE1 moves further rightward in FIG. 12 to reduce the drive region AR1 as the battery remaining charge SOC becomes greater. As the battery remaining charge SOC decreases, the drive region AR1 is moved leftward to expand the drive region AR1.

Further, if the engine 11 is not driven even though the engine 11 is in the drive region AR1, engine startup control means (not shown) of the vehicle control apparatus 51 performs an engine start control operation, and thereby starts up the engine 11. Furthermore, if the engine 11 is driven even though the engine 11 is not in the drive region AR1, engine stop control means (not shown) of the vehicle control apparatus 51 performs an engine stop control operation, and stops driving the engine 11.

Further, if the engine 11 is in the drive region AR1 and the engine 11 is being driven, the engine control device (not shown) of the vehicle control apparatus 51 performs an engine control operation, and controls the engine 11 in a well known method.

Subsequently, the vehicle control apparatus 51 inputs the drive motor rotor position θM, and computes a ring gear rotational speed NR based on the drive motor rotor position θM, and the gear ratio γR of from the output shaft 26 (FIG. 2) to the ring gear R. Furthermore, the means inputs the target engine rotational speed NE* determined by the target engine operation state setting operation, and computes and determines a target generator rotational speed NG* based on the ring gear rotational speed NR and the target engine rotational speed NE* in accordance with the rotational speed relational expression.

Subsequently, generator—generator brake on/off control means (not shown) of the vehicle control apparatus 51 performs a generator—generator brake on/off control operation, that is, performs the on/off (engagement/release) control of the generator brake B, and performs the rotational speed control of the generator 16 by a generator rotational speed control operation, or performs the torque control of the generator 16 by a generator torque control operation.

In this case, as described above, the engine torque TE, the ring gear torque TR and the generator torque TG receive reaction forces from one another. Therefore, the generator torque TG is converted into the ring gear torque TR, and is output from the ring gear R. As the ring gear torque TR is output from the ring gear R, the generator rotational speed NG fluctuates, and the ring gear torque TR fluctuates. Then, the fluctuating ring gear torque TR is transferred to the drive wheels 37, thus degrading the drive feeling of the hybrid vehicle. Therefore, the ring gear torque TR is computed, considering the amount of torque corresponding to the inertia of the generator 16 involved in the fluctuations of the generator rotational speed NG.

Therefore, ring gear torque computing means (not shown) of the vehicle control apparatus 51 performs a ring gear torque computing operation, and thereby inputs the target generator torque TG* determined by the generator rotational speed control operation, and computes the ring gear torque TR based on the ratio of the number of the teeth of the ring gear R to the number of the teeth of the sun gear S.

That is, the sun gear torque TS that acts on the sun gear S is expressed as in:

$$TS = TG^* + InG \cdot \alpha G$$

where InG is the inertia of the generator 16, and αG is the angular acceleration (rotation changing rate) of the generator 16.

Further, if the number of the teeth of the ring gear R is ρ times the number of the teeth of the sun gear S, the ring gear torque TR is ρ times the sun gear torque TS. Therefore, $$TR = \rho \cdot TS$$
$$= \rho \cdot (TG^* + InG \cdot \alpha G)$$

In this manner, the ring gear torque TR can be calculated based on the target generator torque TG*.

Subsequently, the vehicle control apparatus 51 estimates the torque produced on the output shaft 26 by the engine torque TE via the planetary gear unit 13, that is, the drive shaft torque TR/OUT, based on the ring gear torque TR, and the ratio of the number of the teeth of the second counter drive gear 27 to the number of the teeth of the ring gear R. In this case, when the generator brake B is engaged, the ring gear torque TR and the engine torque TE have a proportional relationship, so that the drive shaft torque TR/OUT can be estimated based on the ring gear torque TR, and the ratio of the number of the teeth of the second counter drive gear 27 to the number of the teeth of the ring gear R.

Subsequently, target drive motor torque determining means (not shown) of the vehicle control apparatus 51 performs a target drive motor torque determining operation, that is, subtracts drive shaft torque TR/OUT from the vehicle requested torque TO* so as to determine an amount corresponding to the excess or shortfall of the drive shaft torque TR/OUT as a target drive motor torque TM*.

Then, the drive motor target torque setting means 90 (FIG. 1) corresponding to target drive motor torque restricting means of the vehicle control apparatus 51 performs a drive motor target torque setting operation corresponding to a target drive motor torque restricting operation, and thereby sets and restricts the target drive motor torque TM* based on the battery electric voltage VB so that the drive motor torque TM does not excessively increase if rapid acceleration is performed in response to a great depression of the accelerator pedal 54. Subsequently, drive motor control means (not shown) of the drive motor control device 49 performs a drive motor control operation, and thereby controls the drive motor 25.

Figure 17:
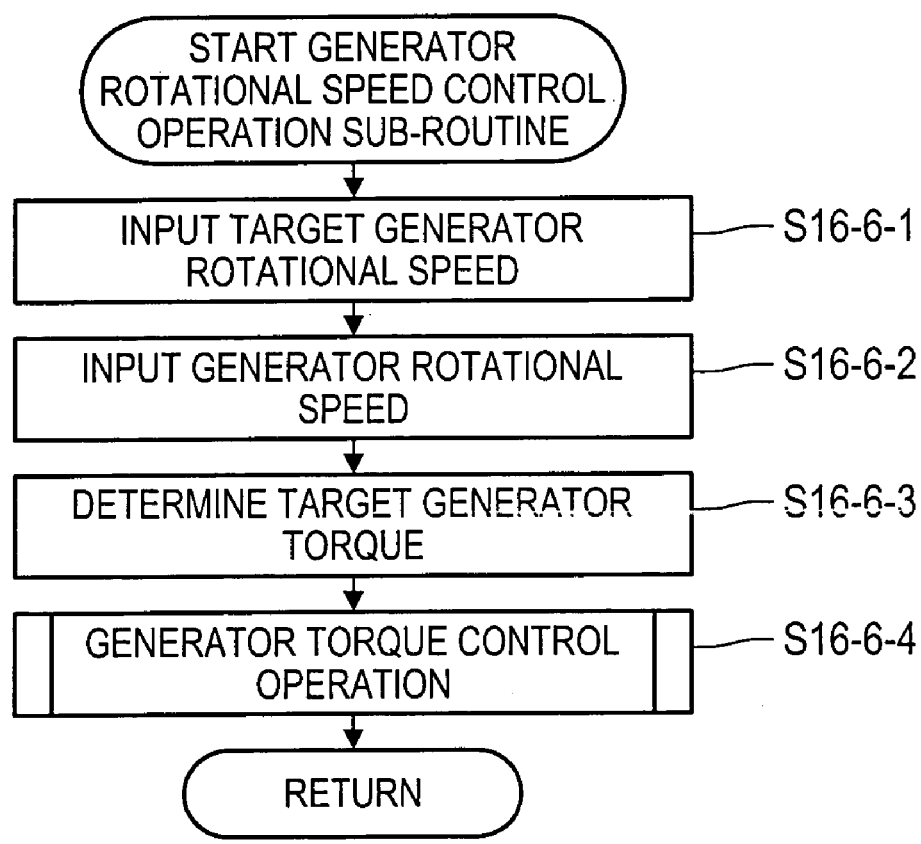
FIG. 17 is a chart illustrating a sub-routine of a generator rotational speed control operation in the first embodiment of the invention.

The flowchart of FIG. 17 will next be described. The operation of the hybrid vehicle begins at step S1 where the accelerator pedal position AP and the brake pedal position BP are input. Then, in step S2, the vehicle speed V is computed and, in step S3, the vehicle requested torque TO* is determined.

In step S4, a determination is made whether the vehicle requested torque TO* is greater than the maximum drive motor torque TMmax. If the vehicle requested torque TO* is greater than the maximum drive motor torque TMmax, the operation proceeds to step S5. If the vehicle requested torque TO* is less than or equal to the maximum drive motor torque TMmax, the operation proceeds to step S7.

In step S5, a determination is made whether the engine 11 is at a stop. If the engine 11 is stopped, the operation proceeds to step S6 where the rapid acceleration control operation is performed, and the operation is ended. If the engine 11 is not at a stop, the operation proceeds to step S7, In step S7, the driver requested output PD is computed and in step S8, the battery charge/discharge requested output PB is computed. Then, in step S9, the vehicle requested output PO is computed and in step S10, the operation point of the engine 11 is determined.

In FIG. 8, the operation proceeds to step S11, where a determination is made whether the engine 11 is in a drive region AR1. If the engine 11 is in the drive region AR1, the operation proceeds to step S12. If the engine 11 is not in the drive region, the operation proceeds to step S13.

In step S12, a determination is made whether the engine 11 is being driven. If the engine 11 is being driven, the operation proceeds to step S16. If the engine 11 is not being driven, the operation proceeds to step S14, where the engine startup control operation is performed.

In step S13, a determination is made whether the engine 11 is being driven. If the engine 11 is being driven, the operation proceeds to step S15 where the engine stop control operation is performed. If the engine 11 is not being driven, the operation proceeds to step S19.

In step S16, the engine control operation is performed and, in step S17, the target generator rotational speed NG* is determined.

Then, in step S18, the generator—generator brake on/off control operation is performed and, in step S19, the drive shaft torque TR/OUT is estimated then, in step S20, the target drive motor torque TM* is determined. In step S21, the target drive motor torque control operation is performed. Finally, in step S22, the drive motor control operation is performed, and the operation is ended.

Figure 13:
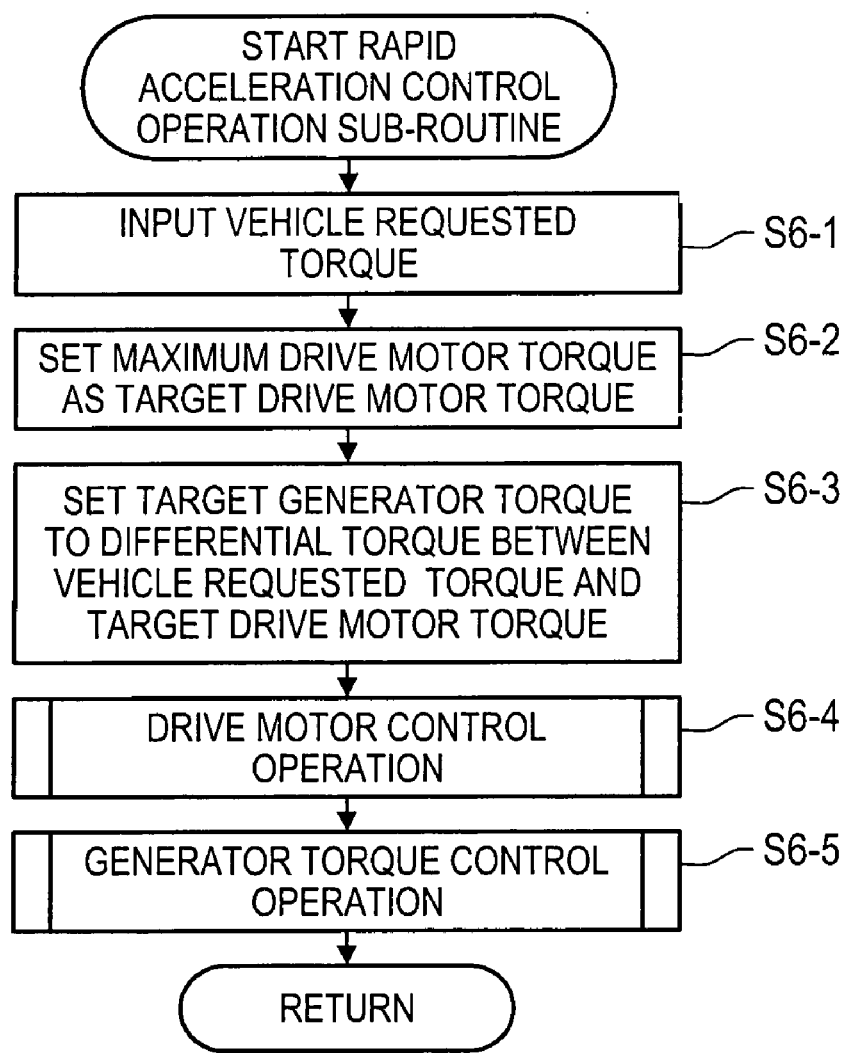
FIG. 13 is a chart illustrating a sub-routine of a rapid acceleration control operation in the first embodiment of the invention.

A sub-routine of the rapid acceleration control operation of step S6 in FIG. 7 will next be described. FIG. 13 is a chart illustrating a sub-routine of the rapid acceleration control operation in the first embodiment of the invention. First of all, the rapid acceleration control means inputs the vehicle requested torque TO*, and computes a differential torque ΔT between the vehicle requested torque TO* and the maximum drive motor torque TMmax, and determines a shortfall of the maximum drive motor torque TMmax as a target generator torque TG*.

Further, the drive motor control means of the rapid acceleration control means performs the drive motor control operation, and thereby sets the target drive motor torque TM* at the maximum drive motor torque TMmax to control the drive motor 25. The generator torque control means of the rapid acceleration control means performs the generator torque control operation, and thereby controls the torque of the generator 16 based on the determined target generator torque TG*.

The flowchart of FIG. 13 will next be described. In step S6-1, the vehicle requested torque TO* is input, and, in step S6-2, the maximum drive motor torque TMmax is set as a target drive motor torque TM*.

In step S6-3, the differential toque ΔT between the vehicle requested torque TO* and the target drive motor torque TM* is set as a target generator torque TG*. Then, in step S6-4, the drive motor control operation is performed, and, in step S6-5, the generator torque control operation is performed, and the process is returned.

Figure 14:
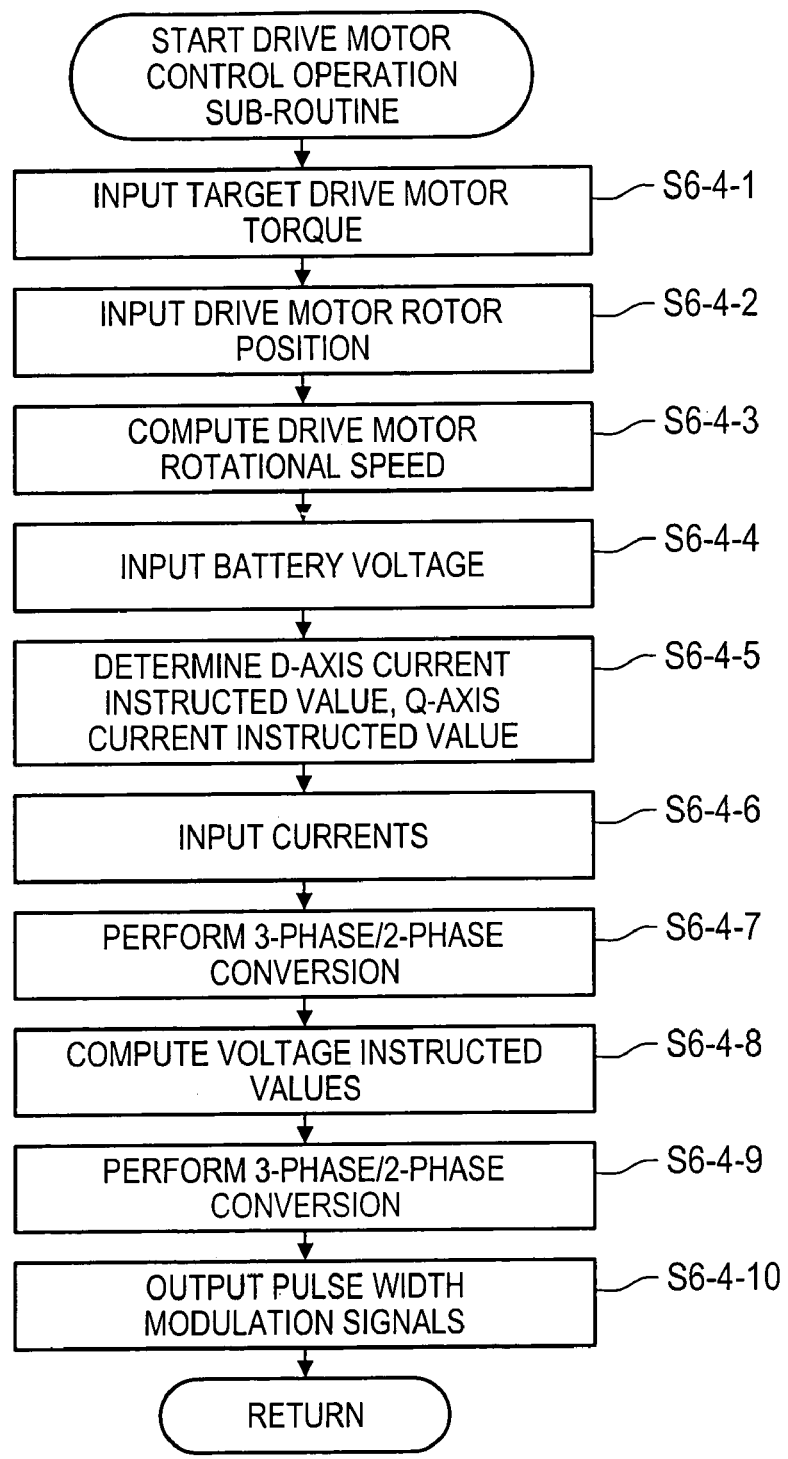
FIG. 14 is a chart illustrating a sub-routine of a drive motor control operation in the first embodiment of the invention.

The sub-routine of the drive motor control operation in step S22 in FIG. 8 and step S6-4 in FIG. 13 will next be described. FIG. 14 is a chart illustrating the sub-routine of the drive motor control operation in the first embodiment of the invention. First of all, the drive motor control means inputs the target drive motor torque TM*, and the drive motor rotor position θM, and computes the drive motor rotational speed NM based on the drive motor rotor position θM, and inputs the battery voltage VB. Subsequently, the drive motor control means determines a d-axis current instructed value IMd* and a q-axis current instructed value IMq* based on the target drive motor torque TM*, the drive motor rotational speed NM and the battery voltage VB, with reference to an electric current instructed value map recorded in the record device of the vehicle control apparatus 51.

Furthermore, the drive motor control means inputs currents IMU and IMV from the current sensors 68 (FIG. 6) and 69, and computes a current IMW from the currents IMU and IMV as in:

$$IMW=IMU-IMV$$

In this case, the current IMW may be detected by a current sensor, as well as the currents IMU and IMV.

Subsequently, the drive motor control means performs a three-phase/two-phase conversion, and thereby converts the currents IMU, IMV and IMW into a d-axis current IMd and a q-axis current IMq, and computes voltage instructed values VMd* and VMq* based on the d-axis current IMd, the q-axis current IMq, the d-axis current instructed value IMd* and the q-axis current instructed value IMq*. Furthermore, the drive motor control means performs a two-phase/three-phase conversion, and thereby converts the voltage instructed values VMd* and VMq* into voltage instructed values VMU*, VMV* and VMW*. The means computes pulse width modulation signals SU, SV and SW based on the voltage instructed values VMU*, VMV* and VMW*, and then outputs the pulse width modulation signals SU, SV and SW to drive means of the drive motor control means. The drive means sends a drive signal SG2 to the inverter 29 based on the pulse width modulation signals SU, SV and SW.

The flowchart of FIG. 14 will next be described. In this case, since the step S22 is the same as the step S6-4, the step S6-4 will be described. In step S6-4-1, the target drive motor torque TM* is input and then, in step S6-4-2, the drive motor rotor position θM is input. In step S6-4-3, the drive motor rotational speed NM is computed and then, in step S6-4-4, the battery voltage VB is input.

In step S6-4-5, the d-axis current instructed value IMd* and the q-axis current instructed value IMq* are determined. In step S6-4-6, the currents IMU and IMV are input, in step S6-4-7, the 3-phase/2-phase conversion is performed and, in step S6-4-8, the voltage instructed values VMd* and VMq* are computed. Then, in step S6-4-9, the 2-phase/3-phase conversion is performed and in step S6-4-10, the pulse width modulation signals SU, SV and SW are output, and the process is returned.

Figure 15:
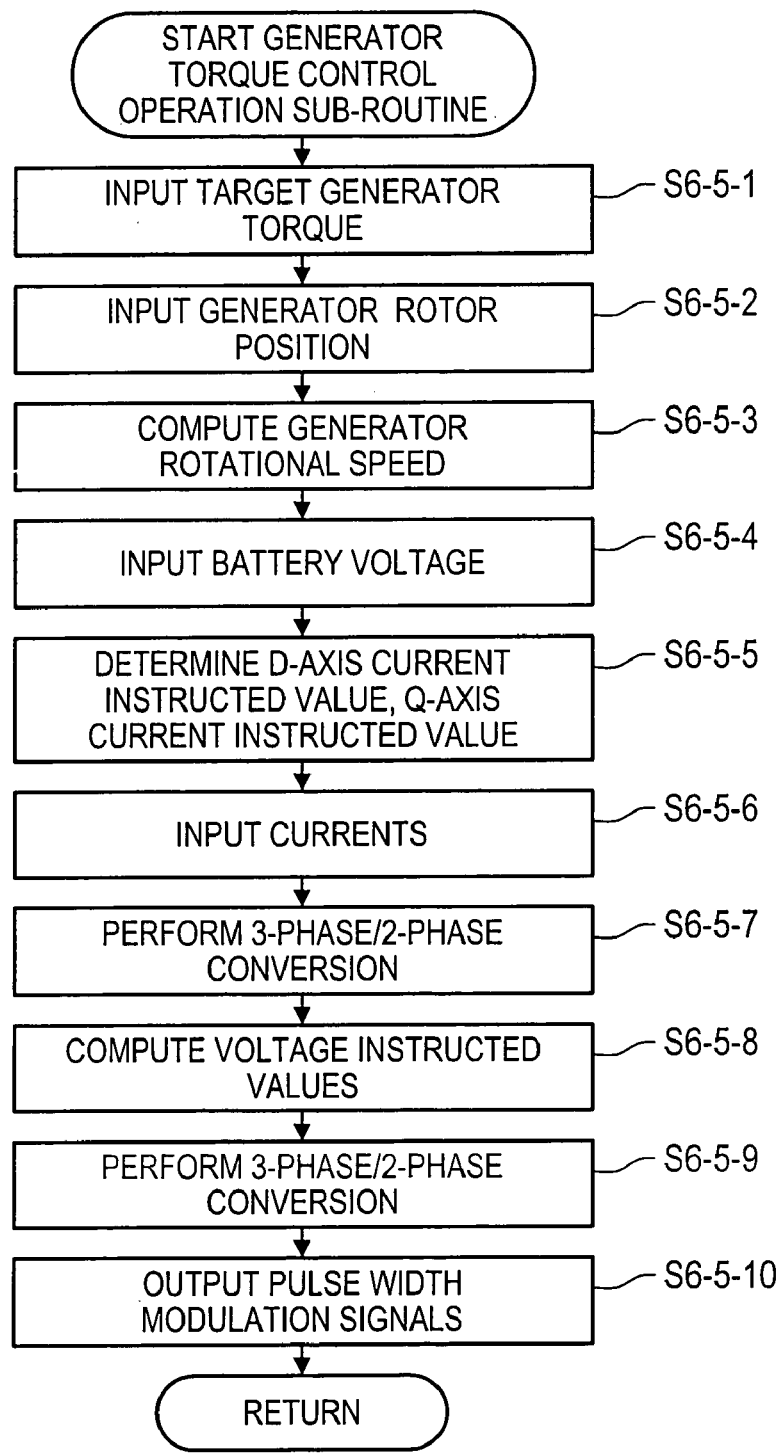
FIG. 15 is a chart illustrating the sub-routine of a generator torque control operation in the first embodiment of the invention.

The sub-routine of the generator torque control operation in step S6-5 in FIG. 13 will next be described. FIG. 15 is a chart illustrating the sub-routine of the generator torque control operation in the first embodiment of the invention. First, the generator torque control means inputs the target generator torque TG* and the generator rotor position θG, and computes the generator rotational speed NG based on the generator rotor position θG, and inputs the battery voltage VB. Subsequently, the generator torque control means determines a d-axis current instructed value IGd* and a q-axis current instructed value IGq* based on the target generator torque TG*, the generator rotational speed NG and the battery voltage VB, with reference to an electric current instructed value map recorded in the record device of the vehicle control apparatus 51.

Furthermore, the generator torque control means inputs currents IGU and IGV from the current sensors 66 (FIG. 6) and 67, and computes a current IGW based on the currents IGU and IGV as in:

$$IGW=IGU-IGV$$

In this case, the current IGW may be detected by a current sensor, as well as IGU and IGV.

Subsequently, the generator torque control means performs a three-phase/two-phase conversion, and thereby converts the currents IGU, IGV and IGW into a d-axis current IGd and a q-axis current IGq, and computes voltage instructed values VGd* and VGq* based on the d-axis current IGd, the q-axis current IGq, the d-axis current instructed value IGd* and the q-axis current instructed value IGq*. Furthermore, the generator torque control means performs a two-phase/three-phase conversion, and thereby converts the voltage instructed values VGd* and VGq* into voltage instructed values VGU*, VGV* and VGW*. The means computes pulse width modulation signals SU, SV and SW based on the voltage instructed values VGU*, VGV* and VGW*, and then outputs the pulse width modulation signals SU, SV and SW to drive means of the generator torque control means. The drive means sends a drive signal SG1 to the inverter 28 based on the pulse width modulation signals SU, SV and SW.

The flowchart of FIG. 15 will next be described. In step S6-5-1, the target generator torque TG* is input, in step S6-5-2, the generator rotor position θG is input and, in step S6-5-3, the generator rotational speed NG is computed. In step S6-5-4, the battery voltage VB is input, in step S6-5-5, the d-axis current instructed value IGd* and the q-axis current instructed value IGq* are determined, and then in, step S6-5-6, the currents IGU and IGV are input. Finally, in step S6-5-7, the 3-phase/2-phase conversion is performed, in step S6-5-8, the voltage instructed values VGd* and VGq* are computed, in step S6-5-9, the 2-phase/3-phase conversion is performed and, in step S6-5-10, the pulse width modulation signals SU, SV and SW are output, and the process is returned.

Figure 16:
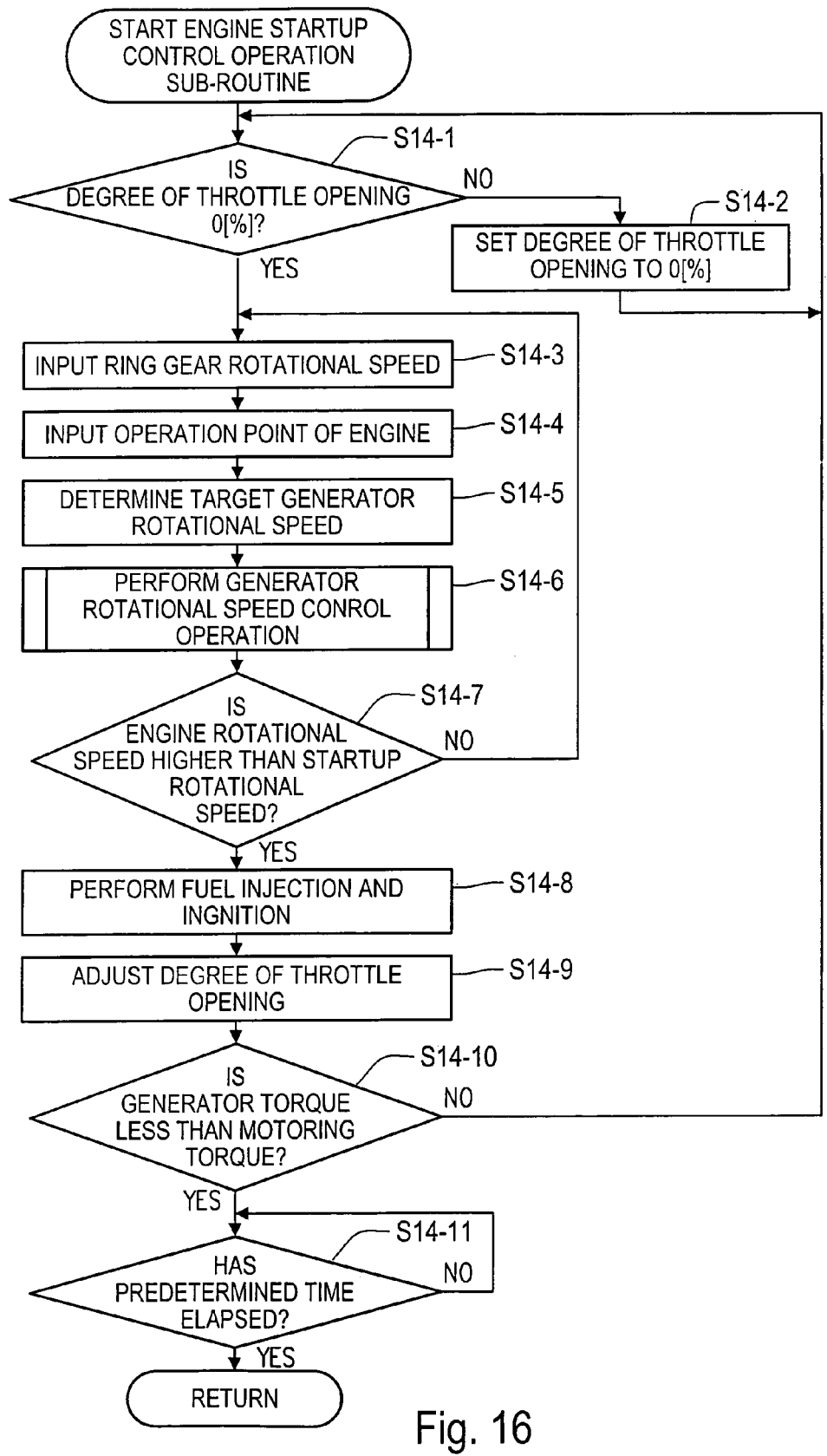
FIG. 16 is a chart illustrating a sub-routine of an engine startup control operation in the first embodiment of the invention.

The sub-routine of the engine startup control operation of step S14 in FIG. 8 will next be described. FIG. 16 is a chart illustrating the sub-routine of the engine startup control operation in the first embodiment of the invention. First of all, the engine startup control means performs the engine start control operation so as to input the degree of throttle opening θ. If the degree of throttle opening θ is 0 [%], the means inputs the ring gear rotational speed NR, and inputs the operation point of the engine 11 (FIG. 6) determined by the target engine operation state setting operation. The ring gear rotational speed NR is computed based on the drive motor rotor position θM and the gear ratio γR as mentioned above.

Subsequently, the engine startup control means computes and determines the target generator rotational speed NG* based on the ring gear rotational speed NR, and the target engine rotational speed NE* at the operation point, in accordance with the rotational speed relational expression.

The generator rotational speed control means of the engine startup control means performs a generator rotational speed control operation based on the target generator rotational speed NG* to increase the generator rotational speed NG and accordingly increase the engine rotational speed NE.

Further, the engine startup control means compares the engine rotational speed NE with a pre-set startup rotational speed NEth1, and determines whether the engine rotational speed NE is higher than the startup rotational speed NEth1. If the engine rotational speed NE is higher than the startup rotational speed NEth1, the engine startup control means performs fuel injection and ignition in the engine 11, and adjusts the degree of throttle opening θ so that the engine rotational speed NE reaches the target engine rotational speed NE*.

Subsequently, the engine startup control means determines whether the generator torque TG is less than a motoring torque TEth associated with startup of the engine 11 in order to determine whether the engine 11 is operating normally. The means waits for a predetermined time to elapse with the generator torque TG being less than the motoring torque TEth.

The flowchart of FIG. 16 will next be described. In step S14-1, a determination is made whether the degree of throttle opening θ is 0 [%]. If the degree of throttle opening θ is 0 [%], the operation proceeds to step S14-3. If the degree of throttle opening θ is not 0 [%], the operation proceeds to step S14-2 where the degree of throttle opening θ is set to 0 [%]. The operation returns to step S14-1.

In step S14-3, the ring gear rotational speed NR is input, in step S14-4, the operation point of the engine 11 is input, in step S14-5, the target generator rotational speed NG* is determined and in step S14-6, the generator rotational speed control operation is performed.

In step S14-7, a determination is made whether the engine rotational speed NE is higher than the startup rotational speed NEth1. If the engine rotational speed NE is higher than the startup rotational speed NEth1, the operation proceeds to step S14-8. If the engine rotational speed NE is less than or equal to the startup rotational speed NEth1, the operation returns to step S14-3. In step S14-8, fuel injection and ignition are performed and, in step S14-9, the degree of throttle opening θ is adjusted.

In step S14-10 a determination is made whether the generator torque TG is less than the motoring torque TEth. If the generator torque TG is less than the motoring torque TEth, the operation proceeds to step S14-11. If the generator torque TG is greater than or equal to the motoring torque TEth, the operation returns to step S14-1. In step S14-11, the elapse of the predetermined time is waited for. The operation is returned.

The sub-routine of the generator rotational speed control operation of step S14-6 in FIG. 16 will next be described. FIG. 17 is a chart illustrating the sub-routine of the generator rotational speed control operation in the first embodiment of the invention. First of all, the generator rotational speed control means inputs the target generator rotational speed NG* and the generator rotational speed NG, and performs a PI control based on a differential rotational speed ΔNG between the target generator rotational speed NG* and the generator rotational speed NG, and computes and determines the target generator torque TG*. In this case, if the differential rotational speed ΔNG becomes greater, as the target generator torque TG* is increased, and the plus/minus sign thereof is also considered. Subsequently, the generator torque control means of the generator rotational speed control means performs a generator torque control operation, and controls the torque of the generator 16.

The flowchart of FIG. 17 will next be described. In step S14-6-1, the target generator rotational speed NG* is input and in step S14-6-2, the generator rotational speed NG is input. In step S14-6-3, the target generator torque TG* is determined and, in step S14-6-4, the generator torque control operation is performed. The process is then returned.

Figure 18:
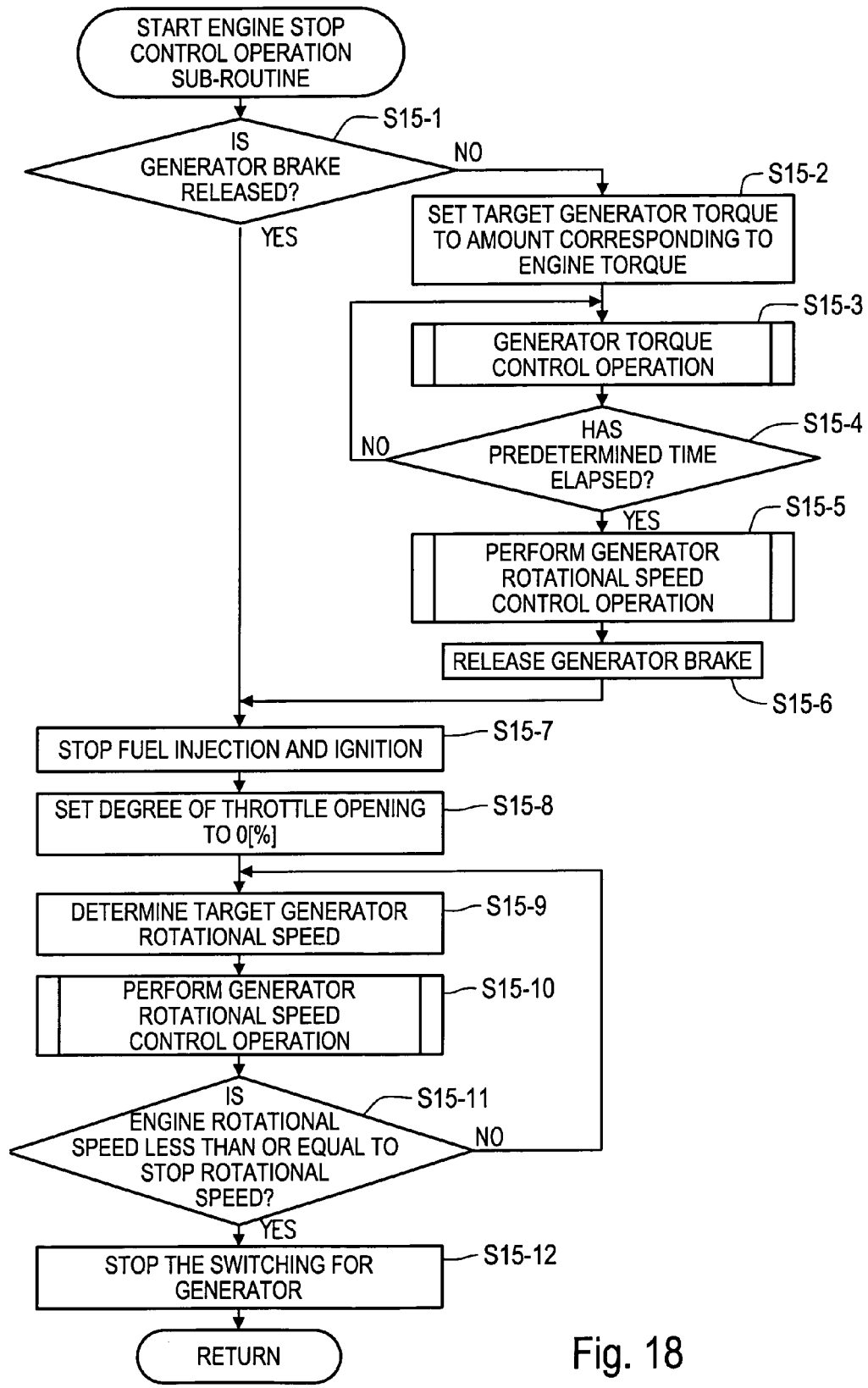
FIG. 18 is a chart illustrating a sub-routine of an engine stop control operation in the first embodiment of the invention.

The sub-routine of the engine stop control operation of step S15 in FIG. 8 will next be described. FIG. 18 is a chart illustrating the sub-routine of the engine stop control operation in the first embodiment of the invention. First, the engine stop control means determines whether the generator brake B (FIG. 6) is released. If the generator brake B is not released but is engaged, the engine stop control means sets the amount corresponding to the engine torque TE as a target generator torque TG*. Next, the generator torque control means of the engine stop control means performs a generator torque control operation in accordance with the target generator torque TG*. After a predetermined time elapses, the generator rotational speed control means of the engine stop control means performs a generator rotational speed control operation similar to that illustrated in FIG. 17. After that, the engine stop control means releases the generator brake B. The amount corresponding to the engine torque TE is computed by learning the ratio of the generator torque TG to the engine torque TE, that is, the torque ratio.

Further, if the generator brake B has been released, and if the generator rotational speed control operation has been performed, the engine stop control means stops the fuel injection and the ignition in the engine 11, and set the degree of throttle opening θ at 0 [%]. Subsequently, the engine stop control means sets the target engine rotational speed NE* at 0 [rpm], and inputs the ring gear rotational speed NR, and determines the target generator rotational speed NG* based on the ring gear rotational speed NR and the target engine rotational speed NE* (0 [rpm]) in accordance with the rotational speed relational expression. Then, the generator rotational speed control means performs a generator rotational speed control operation similar to that illustrated in FIG. 17.

Next, the engine stop control means determines whether the engine rotational speed NE is less than or equal to a stop rotational speed NEth2. If the engine rotational speed NE is less than or equal to the stop rotational speed NEth2, the means stops the switching for the generator 16, and shuts down the generator 16.

The flowchart of FIG. 18 will next be described. In step S15-1, a determination is made whether the generator brake B is released. If the generator brake B has been released, the operation proceeds to step S15-7. If the generator brake B has not been released, the operation proceeds to step S15-2.

In step S15-2, the amount corresponding to the engine torque TE is set as a target generator torque TG* and, in step S15-3, the generator torque control operation is performed.

In step S15-4, a determination is made whether a predetermined time has elapsed. If the predetermined time has elapsed, the operation proceeds to step S15-5. If the time has not elapsed, the operation returns to step S15-3. In step S15-5, the generator rotational speed control operation is performed and, in step S15-6, the generator brake B is released.

In step S15-7, the fuel injection and ignition is stopped, then, in step S15-8, the degree of throttle opening θ is set to 0 [%]. In step S15-9, the target generator rotational speed NG* is determined and, in step S15-10, the generator rotational speed control operation is performed.

In step S15-11, a determination is made whether the engine rotational speed NE is less than or equal to the stop rotational speed NEth2. If the engine rotational speed NE is less than or equal to the stop rotational speed NEth2, the operation proceeds to step S15-12. If the engine rotational speed NE is greater than the stop rotational speed NEth2, the operation returns to step S15-9. In step S15-12, the switching for the generator 16 is stopped. The process is returned.

Figure 19:
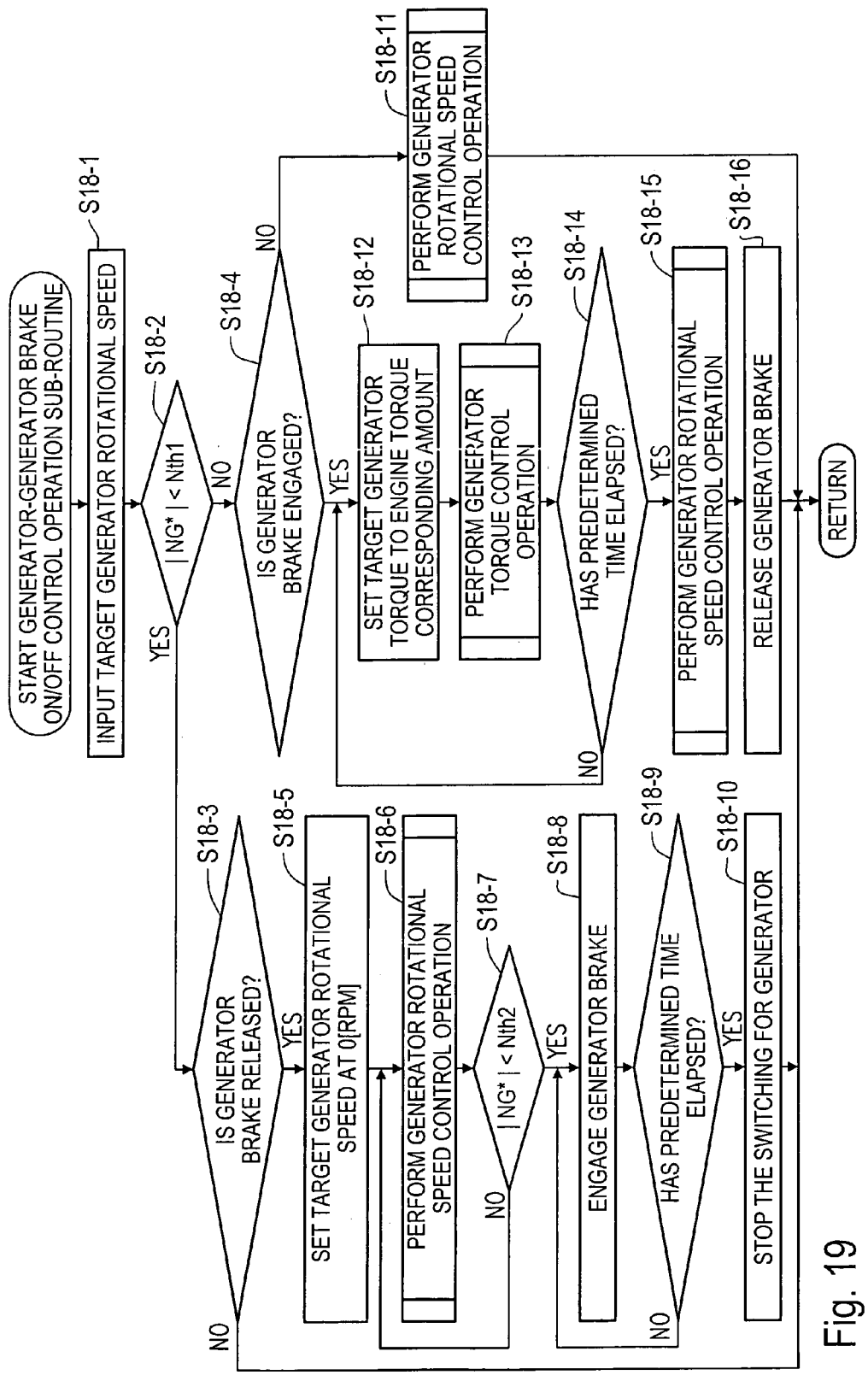
FIG. 19 is a chart illustrating a sub-routine of a generator—generator brake on/off control operation in the first embodiment of the invention.

Next described will be the sub-routine of the generator—generator brake on/off control operation of step S18 in FIG. 8. FIG. 19 is a chart illustrating the sub-routine of the generator—generator brake on/off control operation in the first embodiment of the invention. First, the generator—generator brake on/off control means inputs the target generator rotational speed NG*, and determines whether the absolute value of the target generator rotational speed NG* is less than a first predetermined rotational speed Nth1 (e.g., 500 [rpm]). If the absolute value of the target generator rotational speed NG* is less than the first predetermined rotational speed Nth1, the generator—generator brake on/off control means determines whether the generator brake B (FIG. 6) has been released. If the generator brake B is released, the means sets the target generator rotational speed NG* at 0 [rpm]. Then, the generator rotational speed control means of the generator—generator brake on/off control means performs a generator rotational speed control operation similar to that illustrated in FIG. 17.

Next, the generator—generator brake on/off control means determines whether the absolute value of the generator rotational speed NG is less than a second predetermined rotational speed Nth2 (e.g., 100 [rpm]). If the generator rotational speed NG is less than the second predetermined rotational speed Nth2, the means engages the generator brake B. If a predetermined time elapses with the generator brake B engaged, the generator—generator brake on/off control means stops the switching for the generator 16, and shuts down the generator 16.

Meanwhile, if the absolute value of the target generator rotational speed NG* is greater than or equal to the first predetermined rotational speed Nth1, the generator—generator brake on/off control means determines whether the generator brake B is engaged. If the generator brake B is not engaged, the generator rotational speed control means performs a generator rotational speed control operation similar to that illustrated in FIG. 17.

If the generator brake B is engaged, the generator—generator brake on/off control means sets the engine torque TE-corresponding amount as a target generator torque TG*. Then, the generator torque control means of the generator—generator brake on/off control means performs a generator torque control operation.

Subsequently, if a predetermined time elapses after the generator torque control operation is performed, the generator rotational speed control means performs a generator rotational speed control operation similar to that illustrated in FIG. 17. Then, the generator—generator brake on/off control means releases the generator brake B.

The flowchart of FIG. 19 will next be described. In step S18-1, the target generator rotational speed NG* is input. Then, in step S18-2, a determination is made whether the absolute value of the target generator rotational speed NG* is less than the first predetermined rotational speed Nth1. If the absolute value of the target generator rotational speed NG* is less than the first predetermined rotational speed Nth1, the operation proceeds to step S18-3. If the absolute value of the target generator rotational speed NG* is greater than or equal to the first predetermined rotational speed Nth1, the operation proceeds to step S18-4.

In step S18-3, a determination is made whether the generator brake B is released. If the generator brake B is released, the operation proceeds to step S18-5. If the generator brake B is not released, the operation is returned.

In step S18-5, the target generator rotational speed NG* is set at 0 [rpm] and, in step S18-6, the generator rotational speed control operation is performed.

In step S18-7, a determination is made whether the absolute value of the generator rotational speed NG is less than the second predetermined rotational speed Nth2. If the absolute value of the generator rotational speed NG is less than the second predetermined rotational speed Nth2, the operation proceeds to step S18-8 where the generator brake B is engaged. If the absolute value of the generator rotational speed NG is greater than or equal to the second predetermined rotational speed Nth2, the operation returns to step S18-6.

In step S18-9, a determination is made whether the predetermined time has elapsed. If the predetermined time has elapsed, the operation proceeds to step S18-10 where the switching for the generator 16 is topped and the operation is returned. If the predetermined time has not elapsed, the operation returns to step S18-8

In step S18-4, a determination is made whether the generator brake B is engaged. If the generator brake B is engaged, the operation proceeds to step S18-12. If the generator brake B is not engaged, the operation proceeds to step S18-11, where the generator rotational speed control operation is performed. The process is returned.

In step S18-12, the engine torque TE-corresponding amount is set as a target generator torque TG* and, in step S18-13, the generator torque control operation is performed. In step S18-14, a determination is made whether the predetermined time has elapsed. If the predetermined time has elapsed, the operation proceeds to step S18-15. If the predetermined time has not elapsed, the operation returns to step S18-12.

In step 18-15, the generator rotational speed control operation is performed and in step 18-16, The generator brake B is released. The operation is returned.

Figure 20:
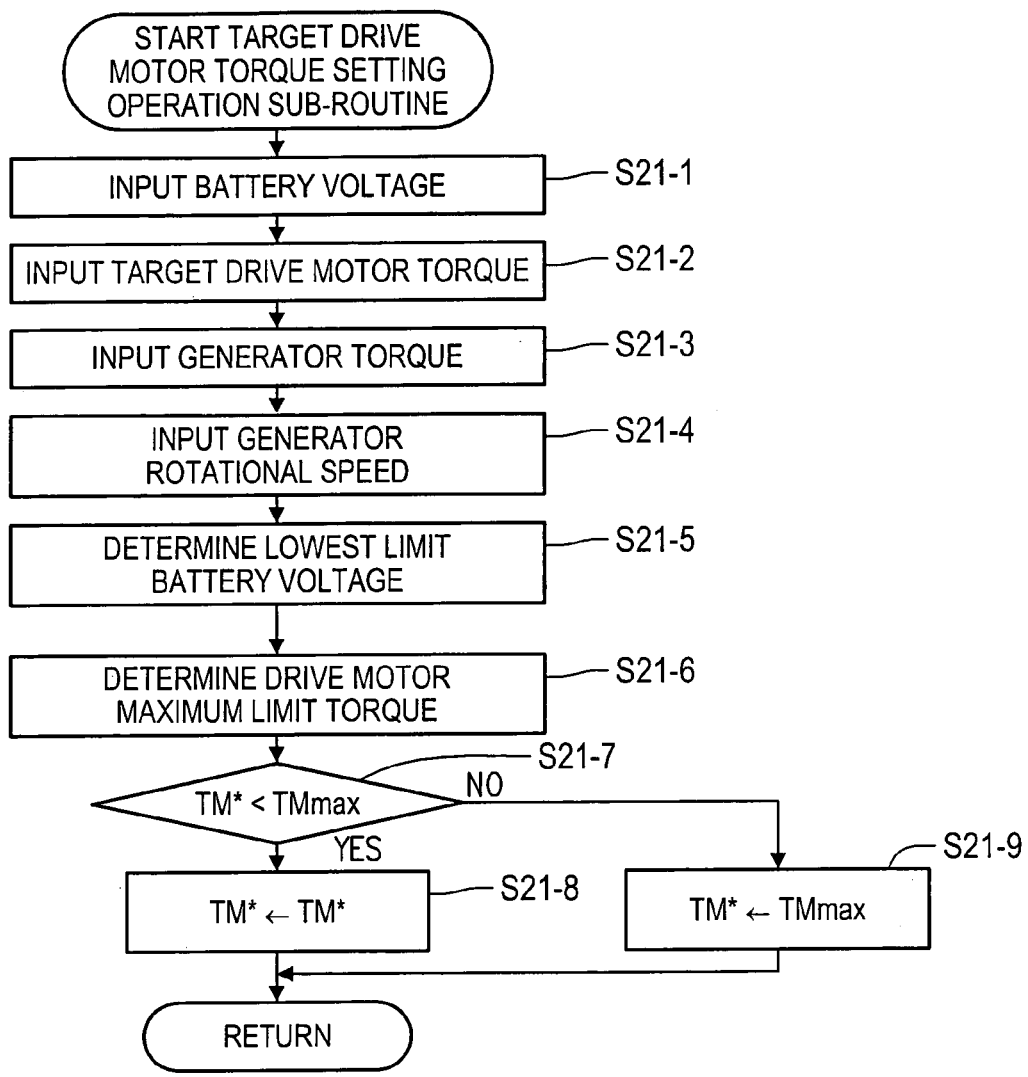
FIG. 20 is a chart illustrating a sub-routine of a target drive motor torque setting operation in the first embodiment of the invention.
Figure 21:
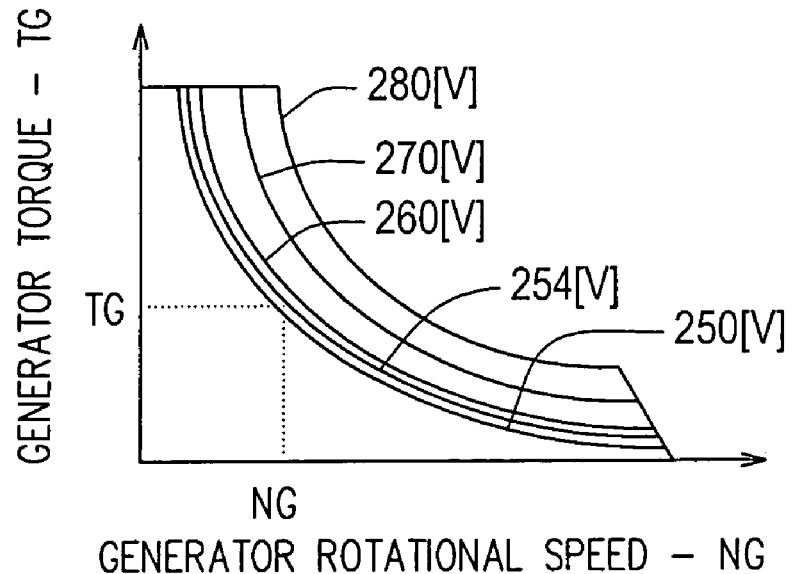
FIG. 21 is a diagram indicating a generator drive state map in the first embodiment of the invention.
Figure 22:
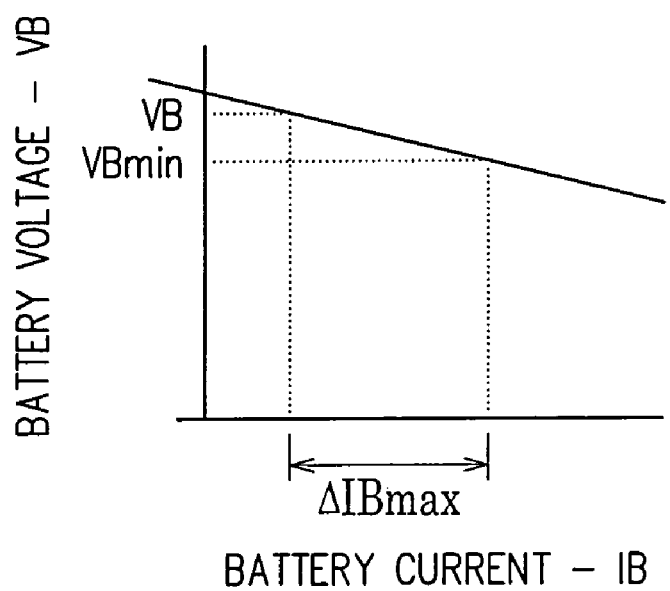
FIG. 22 is a diagram indicating a battery characteristic in the first embodiment of the invention.
Figure 23:
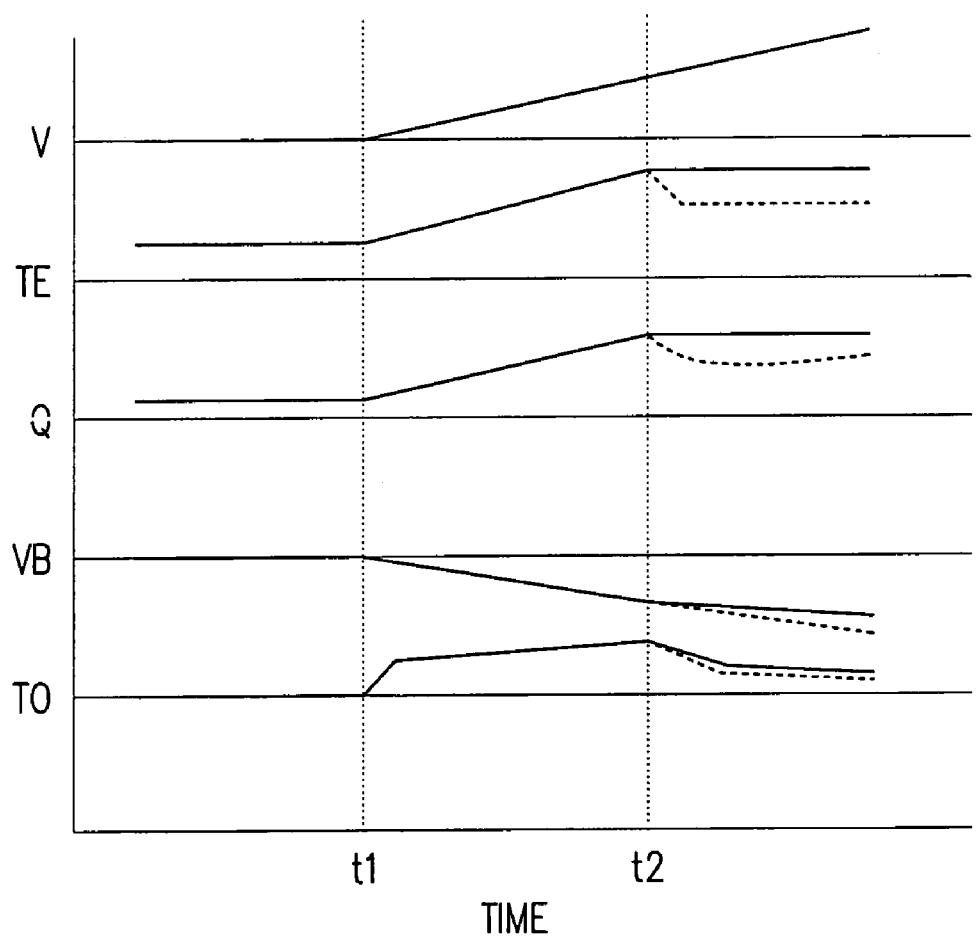
FIG. 23 is a time chart indicating an operation of the vehicle control apparatus in the first embodiment of the invention.

Next described will be the sub-routine of the target drive motor torque setting operation of step S21 in FIG. 8. FIG. 20 is a chart illustrating the sub-routine of the target drive motor torque setting operation in the first embodiment of the invention. FIG. 21 is a diagram indicating a generator drive state map in the first embodiment of the invention. FIG. 22 is a diagram indicating a battery characteristic in the first embodiment of the invention. FIG. 23 is a time chart indicating the operation of the vehicle control apparatus in the first embodiment of the invention. In this case, in FIG. 21, the horizontal axis indicates the generator rotational speed NG, and the vertical axis indicates the generator torque TG. In FIG. 22, the horizontal axis indicates the battery current IB, and the vertical axis indicates the battery voltage VB.

First, the target drive motor torque setting means 90 (FIG. 1) performs the target drive motor torque setting operation so as to input the battery voltage VB, the target drive motor torque TM*, the generator torque TG, and the generator rotational speed NG which represents the battery state detected by the batter voltage sensor 72. As the generator torque TG, it is possible to use the latest target generator torque TG* or a generator torque detected by a torque sensor or the like.

Subsequently, the lowest limit value computing means (not shown) of the target drive motor torque setting means 90 computes and determines a lowest limit value of the battery voltage VB that does not cause the racing of the generator 16, that is, a lowest limit battery voltage VBmin, based on the operation point representing the rotational state of the generator 16 (FIG. 6) which is represented by the generator rotational speed NG and the generator torque TG, with reference to the generator drive state map of FIG. 21. In this case, the lowest limit battery voltage VBmin is also a battery voltage VB that allows the generator 16 to maintain at least the present rotational state.

Considering calculation errors, control delay or the like, a margin may be provided for the lowest limit battery voltage VBmin. For example, if the lowest limit battery voltage VBmin in the generator drive state map is 254 [V], a margin of 10 [V] may be provided to make a lowest limit battery voltage VBmin 264 [V].

Next, restriction value computing means (not shown) of the target drive motor torque setting means 90 computes and sets a maximum limit value of the target drive motor torque TM*, that is, a maximum drive motor torque TMmax, based on the following expression, so that the battery voltage VB representing the present battery state is over and does not become less than or equal to the lowest limit battery voltage VBmin, and restricts the target drive motor torque TM*. That is, a difference ΔVB between the battery voltage VB and the lowest limit battery voltage VBmin is:

$$\Delta VB = VB - VBmin$$

The margin ΔIBmax of the battery current IB corresponding to the difference ΔVB is:

$$\Delta IBmax = \Delta VB \cdot K$$

where:
K: factor determined by IB/VB

Then, the maximum output PMmax of the drive motor 25 determined by the margin value Δ IBmax is:

$$PMmax = VBmin \cdot \Delta IBmax \cdot \mu B - TM \cdot NM \cdot \mu M - TG \cdot NG \cdot \mu G$$

The drive motor maximum torque TMmax is:

$$TMmax = PMmax/NM$$

In these expressions, μB, μM and μG are the efficiencies of the battery 43, the drive motor 25 and the generator 16, respectively. Further, as for the unit of the drive motor torque TM and the generator torque TG, the motoring (driving) side is defined as positive, and the regeneration (power generation) side is defined as negative. The drive motor maximum torque TMmax may be computed through the PI control of the difference ΔVB.

Subsequently, the target drive motor torque setting means 90 determines whether the target drive motor torque TM* is less than the drive motor maximum torque TMmax. If the target drive motor torque TM* is less than the drive motor maximum torque TMmax, the present target drive motor torque TM* is immediately set as a target drive motor torque TM*. If the target drive motor torque TM* is greater than or equal to the drive motor maximum torque TMmax, the drive motor maximum torque TMmax is set as a target drive motor torque TM*, and the target drive motor torque TM* is restricted so as not to exceed the same.

Thus, the battery voltage VB is input, and the drive motor maximum torque TMmax is computed based on the battery voltage VB and the lowest limit battery voltage VBmin that does not cause the racing for the generator 16. Then, the target drive motor torque TM* is restricted so as not to becomes greater than or equal to the drive motor maximum torque TMmax. Therefore, even if the accelerator pedal 54 is greatly depressed to cause rapid acceleration so that the vehicle speed V is sharply increased between timings t1 and t2 as indicated in FIG. 23, the drive motor torque TM does not become great. Further, since the currents IMU, IMV and IMW supplied to the drive motor 25 do not become great, no sharp reduction occurs in the battery voltage VB. Therefore, the generator torque TG does not become small, and the engine torque TE can be supported, so that the engine 11 will not race. Thus, a sharp increase in the engine rotational speed NE can be prevented.

Furthermore, there is no need to reduce the engine torque TE in order to prevent the racing of the engine 11. Therefore, the engine 11 can be driven at a point on the optimal fuel economy curve, so that the efficiency of the engine 11 can be improved. As a result, the total output expressed by the output torque TO of the hybrid vehicle can be increased.

Furthermore, since there is not need to reduce the engine torque TE, it is possible to prevent a reduction in the amount of electric power generated by the generator 16. As a result, the drive motor torque TM can be correspondingly increased.

Still further, the engine 11 can be driven at a point on the optimal fuel economy curve, and there is no need to sharply change the degree of throttle opening δ. Therefore, it is possible to prevent deterioration in the state of exhaust gas.

In this case, the engine 11 often starts irrespective of a shift position SP, for example, in a case where an air conditioner or the like is operated. The battery electric voltage VB becomes temporarily low in accordance with the start of the engine 11. However, when the start of the engine 11 is finished, the battery electric voltage VB is recovered. Accordingly, in such a case where the engine 11 is not under a steady state, as in the case where the engine 11 is started, that is, in the case where the generator rotational speed NG is lower than a threshold value NGth, or the engine rotational speed NE is lower than an idle rotational speed Nid, the lowest limit value computing means does not compute the lowest limit battery voltage VBmin, and the target drive motor torque TM* is not restricted.

In this case, when the accelerator pedal 54 is pedaled down largely in such a case where the vehicle speed V and the drive motor rotational speed NM are extremely low as a case where the hybrid vehicle runs on the curb or the like, the drive motor 25 and the generator 16 are driven, and the battery electric voltage VB becomes suddenly low. Accordingly, in the case where the generator rotational speed NG is equal to or more than the threshold value NGth, and the engine rotational speed NE is equal to or more than the idle rotational speed Nid, the lowest limit value computing means computes the lowest limit battery electric voltage VBmin irrespective of the drive motor rotational speed NM.

Further, in a maximum torque region in which the generator torque TG in FIG. 21 extends horizontally, it is possible to generate a sufficient generator torque TG by the generator 16, whatever value the lowest limit battery electric voltage VBmin is. Therefore, it is possible to support the engine torque TE. Then, in the case where the generator torque TG is in the maximum torque region, the lowest limit value computing means does not compute the lowest limit battery electric voltage VBmin.

The flowchart of FIG. 20 will next be described. In step S21-1, the battery voltage VB is input, in step S21-2, the target drive motor torque TM* is input and, in step S21-3, the generator torque TG is input. In step S21-4, the generator rotational speed NG is input, in step S21-5, the lowest limit battery voltage VBmin is determined and, in step S21-6, the drive motor maximum torque TMmax is determined.

In step S21-7, a determination is made whether the target drive motor torque TM* is less than the drive motor maximum torque TMmax. If the target drive motor torque TM* is less than the drive motor maximum torque TMmax, the operation proceeds to step S21-8. If the target drive motor torque TM* is greater than or equal to the drive motor maximum torque TMmax, the operation proceeds to step S21-9. In step S21-8, the target drive motor torque TM* is set as target drive motor torque TM*. The process is returned. In step S21-9, the drive motor maximum torque TMmax is set as target drive motor torque TM*. The process is returned.

Figure 24:
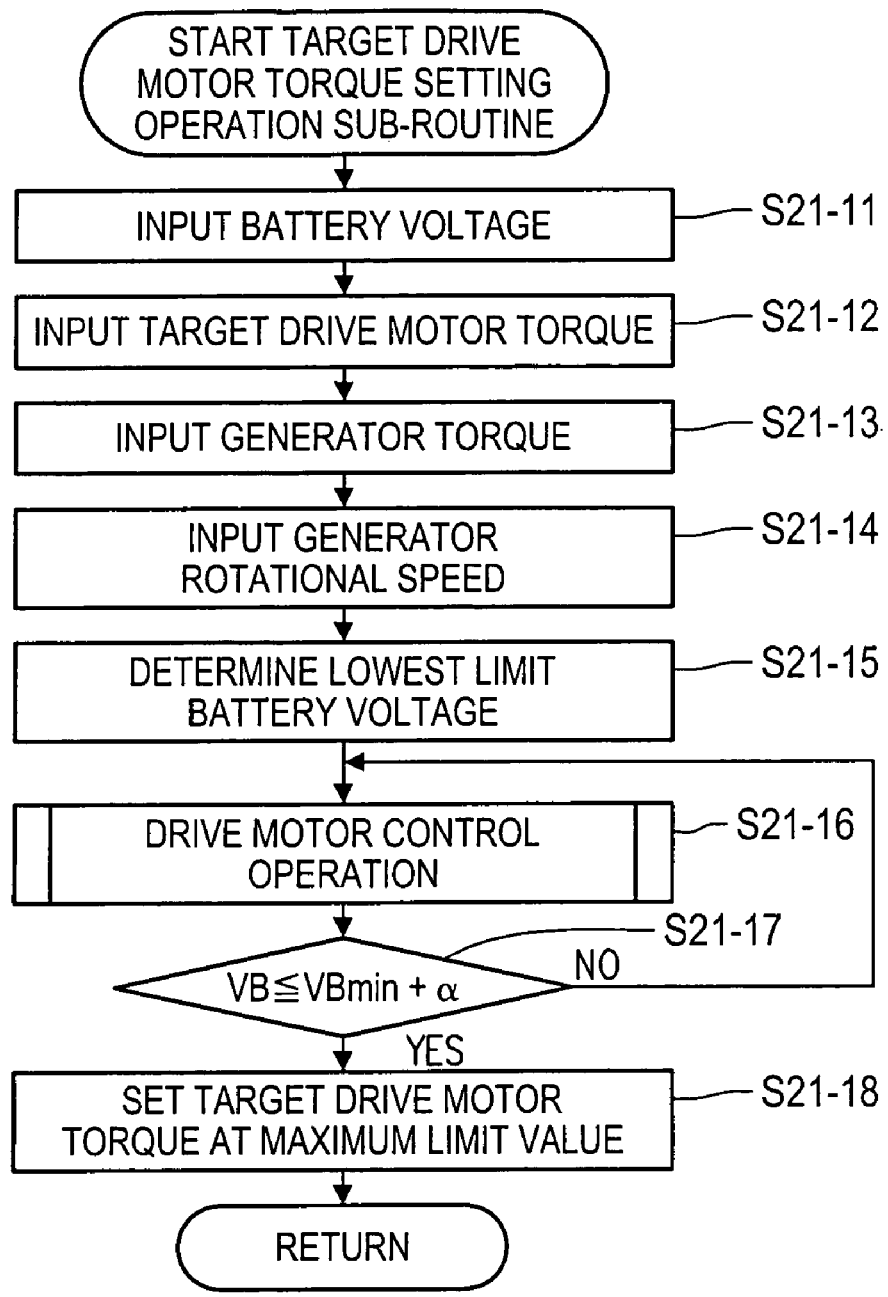
FIG. 24 is a chart illustrating a sub-routine of the target drive motor torque setting operation in accordance with a second embodiment of the invention.

A second embodiment of the invention will next be described. FIG. 24 is a chart illustrating a sub-routine of the target drive motor torque setting operation in accordance with the second embodiment of the invention. First, the target drive motor torque setting means 90 (FIG. 1) performs the target drive motor torque setting operation so as to input the battery voltage VB representing the battery state, the target drive motor torque TM*, the generator torque TG, and the generator rotational speed NG.

Subsequently, the lowest limit value computing means (not shown) of the target drive motor torque setting means 90 computes and determines a lowest limit battery voltage VBmin from the operation point expressing the rotational state of the generator 16 (FIG. 6), with reference to the generator drive state map of FIG. 21.

Further, the restriction value computing means (not shown) of the target drive motor torque setting means 90 performs a drive motor control operation shown in FIG. 14, and thereby determines whether the battery voltage VB is less than or equal to a value (VBmin+α) obtained by adding a value α to the lowest limit battery voltage VBmin. If the battery voltage VB is less than or equal to the value (VBmin+α), the means 90 computes a maximum limit value TG·NG/NM of the target drive motor torque TM*, sets the maximum limit value TG·NG/NM as the target drive motor torque TM*, and restricts the target drive motor torque TM* so as not to be over the same.

The maximum limit value TG·NG/NM is obtained by dividing a multiplication product of the generator torque TG and the generator rotational speed NG by the drive motor rotational speed NM, corresponds to a difference between the battery voltage VB representing the present battery state and the lowest limit battery voltage VBmin, and expresses the torque that makes it possible to provide the battery voltage VB only by the electric power generated by the generator 16. The value α is a margin added to the lowest limit battery voltage VBmin, considering the calculation error, the control delay or the like. However, in the case where a margin is given at a time of determining the lowest limit battery voltage VBmin, it is not necessary to add the value α.

The flowchart of FIG. 24 will next be described. In step S21-11, the battery voltage VB is input, in step S21-12, the target drive motor torque TM* is input and, in step S21-13, the generator torque TG is input. Then, in step S21-14, the generator rotational speed NG is input, in step S21-15, the lowest limit battery voltage VBmin is determined and, in step S21-16, the drive motor control operation is performed.

In step S21-17, a determination is made whether the battery voltage VB is less than or equal to value (VBmin+α). If the battery voltage VB is less than or equal to the value (VBmin+α), the operation proceeds to step S21-18. If the battery voltage VB is greater than the value (VBmin+α), the operation returns to step S21-16. In step S21-18, the target drive motor torque TM* is set at the maximum limit value TG·NG/NM. The operation is returned.

Figure 25:
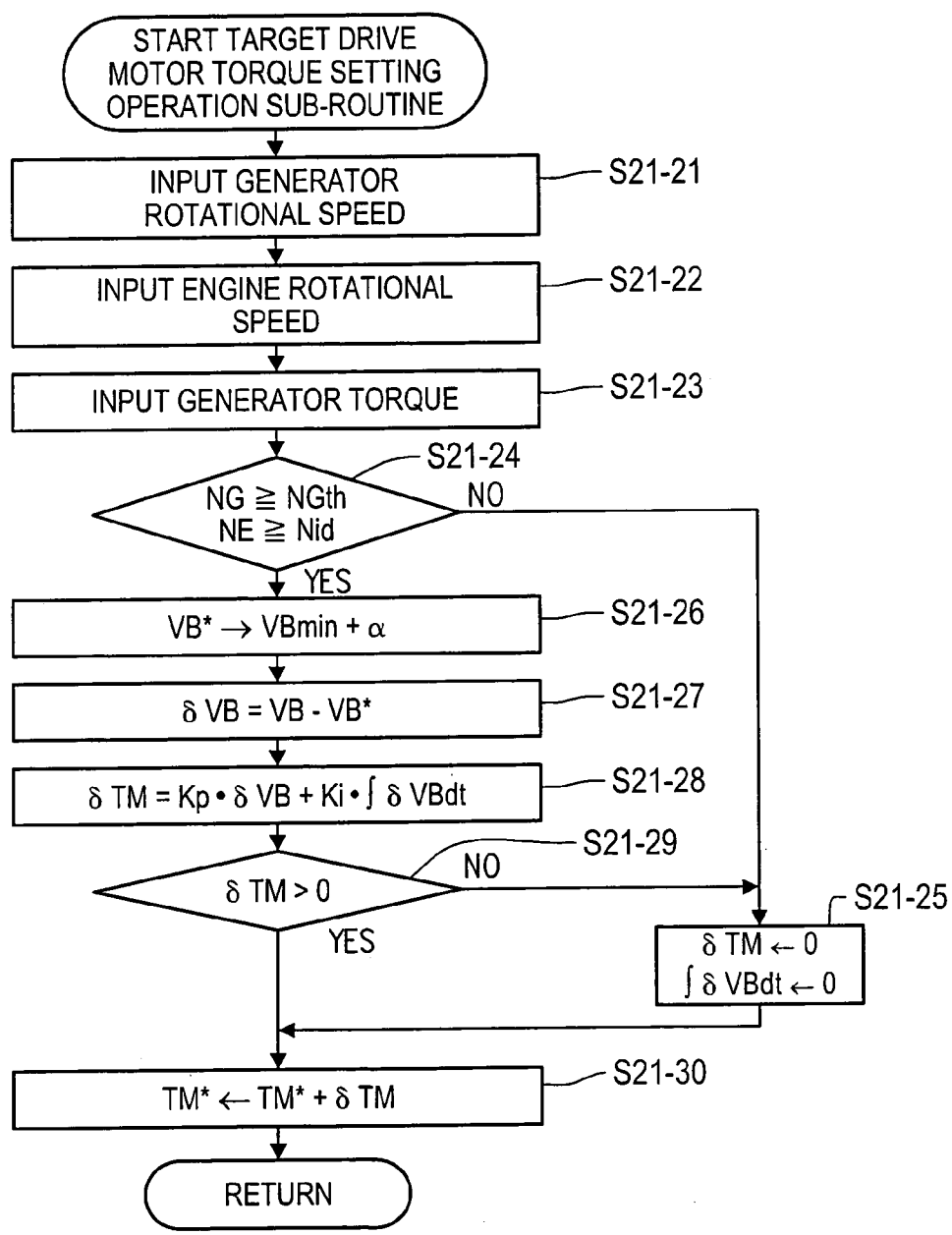
FIG. 25 is a chart illustrating a sub-routine of the target drive motor torque setting operation in accordance with a third embodiment of the invention.

A third embodiment of the invention will next be described. FIG. 25 is a chart illustrating a sub-routine of the target drive motor torque setting operation in accordance with the third embodiment of the invention. First, the target drive motor torque setting means 90 (FIG. 1) performs the target drive motor torque setting operation so as to input the generator rotational speed NG, the engine rotational speed NE and the generator torque TG. In this case, the newest target generator torque TG* may be used as the generator torque TG, or the generator torque detected by the torque sensor or the like may be used.

Next, the target drive motor torque setting means 90 determines whether the engine 11 (FIG. 6) is started and the engine 11 is in a steady state. Accordingly, the target drive motor torque setting means 90 determines whether the generator rotational speed NG is equal to or more than the threshold value NGth (for example, 3000 [rpm]), and whether the engine rotational speed NE is equal to or more than the idle rotational speed Nid.

Then, in the case where the engine 11 is in the steady state, the generator rotational speed NG is equal to or more than the threshold value NGth, and the engine rotational speed NE is equal to or more than the idle rotational speed Nid, the lowest limit value computing means (not shown) of the target drive motor torque setting means 90 computes and determined the lowest limit battery voltage VBmin based on the operation point expressing the rotational state of the generator 16, with reference to the generator driving state map in FIG. 21.

Subsequently, the limit value computing means (not shown) of the target drive motor torque setting means 90 corrects and restricts the target drive motor torque TM* so that the battery voltage VB expressing the present battery state does not become equal to or less than the lowest limit battery voltage VBmin. Accordingly, the limit value computing means computes a value (VBmin+α) obtained by adding the value α to the lowest limit battery voltage VBmin as a battery voltage target value VB*. The battery voltage target value VB* expresses the target value of the battery voltage VB that does not cause the racing of the generator 16, and a direct voltage target value and a lowest limit value are formed using the battery voltage target value VB*.

Further, the value α is the margin added to the lowest limit battery voltage VBmin, considering the calculation error, the control delay or the like. However, in the case where a margin is given at a time of determining the lowest limit battery voltage VBmin, it is not necessary to add.

Next, the limit value computing means computes a difference between the battery voltage VB and the battery voltage target value VB*, that is, a voltage deviation δVB:

$$\delta VB = VB - VB^*$$

The limit value computing means performs a PI control of the drive motor torque TM based on the voltage deviation δVB. That is, the limit value computing means computes a correction value δTM constituted by a proportional and an integral of the drive motor torque TM:

$$\delta TM = Kp \cdot \delta VB + Ki \cdot \int \delta VB\, dt$$

In this case, Kp is a gain of the proportional and Ki is a gain of the integral.

Further, the limit value computing means determines whether the correction value δTM is a positive value. In the case where the correction value δTM is the positive value, a value obtained by adding the correction value δTM to the target motor torque TM* is set to the target motor torque TM*, and in the case where the correction value δTM is 0 or a negative value, the correction value δTM is set to 0, and the value Ki·∫ δVBdt in the integral is set to 0.

Since the target drive motor torque TM* is corrected by the correction value δ TM even if the accelerator pedal 54 is largely depressed, the sudden acceleration is performed, and the vehicle speed is suddenly made high, the currents IMU, IMV and IMW supplied to the drive motor 25 do not become large. Accordingly, the battery voltage VB does not suddenly become low. In this case, the target drive motor torque TM* after being corrected expresses a torque which makes it possible to provide the battery voltage VB only by the electric power generated by the generator 16.

The flowchart of FIG. 25 will next be described. In step S21-21, the generator rotational speed NG is input, in step S21-22, the engine rotational speed NE is input and, in step S21-23, the generator torque TG is input.

In step S21-24, a determination is made whether the generator rotational speed NG is equal to or more than the threshold value NGth, and the engine rotational speed NE is equal to or more than the idle rotational speed Nid. In the case where the generator rotational speed NG is equal to or more than the threshold value NGth, and the engine rotational speed NE is equal to or more than the idle rotational speed Nid, the operation proceeds to step S21-26. In the case where the generator rotational speed NG is lower than the threshold value NGth, and the engine rotational speed NE is lower than the idle rotational speed Nid, the operation proceeds to step S21-25 where the correction value δ TM is set to zero, and the value ∫ δ VBdt is set to zero.

In step S21-26, the target battery voltage value VB* is set to the value obtained by adding the value α to the lowest limit battery voltage VBmin*, in step S21-27, the voltage deviation δVB is set to the value obtained by subtracting the target battery voltage value VB* from the battery voltage VB and, in step S21-28, the correction value δTM is computed.

In step S21-29, a determination is made whether the correction value δ TM is larger than zero. In the case where the correction value δ TM is larger than zero, the operation proceeds to step S21-30. In the case where the correction value δ TM is equal to or less than zero, the operation proceeds to step S21-25. In step S21-30, the target drive motor torque TM* is set to the value obtained by adding the correction value δ TM to the target drive motor torque TM*, and the operation is finished.

Although in the foregoing embodiments, the one-way clutch F (FIG. 2) is disposed, the one-way clutch is not always necessary. If the one-way clutch is omitted, the rapid acceleration control operation illustrated in FIGS. 7 and 13 may be omitted.

Although in the foregoing embodiments, the generator brake B is disposed, the generator brake B is not always necessary. If the generator brake B is not disposed, the generator—generator brake on/off control operation illustrated in FIGS. 8 and 19 may be omitted.

The invention is not limited to the above-described embodiments, but may be modified in various manners based on the spirit of the invention, and such modifications are not excluded from the scope of the invention.

According to the embodiments of the invention, the target drive motor torque is set based on the battery state. Therefore, even if the accelerator pedal is greatly depressed so that rapid acceleration is caused and the vehicle speed is sharply increased, the drive motor torque is not increased. Since the electric current supplied to the drive motor does not become great, the battery state is not sharply reduced. Therefore, since the generator torque does not become small, but is able to support the engine torque, the engine does not race, so that a sharp increase in the engine rotational speed can be prevented.

Furthermore, there is no need to reduce the engine torque in order to prevent the engine from racing, the engine can be driven at a point on the optimal fuel economy curve, so that the engine efficiency can be improved. As a result, the total output of the hybrid vehicle can be increased.

Furthermore, since there is no need to reduce the engine torque, a reduction in the amount of electric power generated by the generator can be prevented. Therefore, the drive motor torque can be correspondingly increased, so that the total output of the hybrid vehicle can be further increased.

Still further, since the engine can be driven at a point on the optimal fuel economy curve and there is no need to sharply change the degree of throttle opening, the state of exhaust gas does not deteriorate.

The disclosure of Japanese Patent Application No. 2001-65679 filed Mar. 8, 2001 and Japanese Patent Application No. 2002-49472 filed Feb. 26, 2002 including specifications, drawings and claims are incorporated herein by reference in their entirety.

The invention claimed is:

1. A hybrid vehicle drive control apparatus, comprising:
   an electric power generator mechanically connected to an engine;
   a drive motor driven by at least one of an electric current generated by the electric power generator and an electric current supplied from a battery;
   a detector that detects a battery state of the battery; and
   a controller that:
   calculates a lowest limit value of the battery state based on a rotating state of the electric power generator; and
   sets a target torque of the drive motor based on the lowest limit value of the battery state.

2. The hybrid vehicle drive control apparatus according to claim 1, wherein the controller calculates the lowest limit value of the battery state which does not cause the electric power generator to race.

3. The hybrid vehicle drive control apparatus according to claim 2, wherein the controller calculates a maximum limit value of the target torque of the drive motor based on a difference between a present value of the battery state and the lowest limit value of the battery state, and sets the target torque of the drive motor so as not to exceed the maximum limit value.

4. The hybrid vehicle drive control apparatus according to claim 2, wherein the controller sets the target torque of the drive motor at such a value that a battery state can be maintained only by an electric power generated by the electric power generator.

5. The hybrid vehicle drive control apparatus according to claim 2, wherein the controller calculates a correction value of the target torque of the drive motor based on a difference between a present value of the battery state and the lowest limit value of the battery state, and corrects the target torque of the drive motor by the correction value.

6. The hybrid vehicle drive control apparatus according to claim 1, wherein the controller calculates the lowest limit value of the battery state which at least allows the electric power generator to maintain a present rotational state.

7. The hybrid vehicle drive control apparatus according to claim 1, further comprising:
an output shaft mechanically connected to the drive motor and a drive wheel; and
a differential gear device that has at least three gear elements, each of the gear elements being connected to the engine, the electric power generator, and the output shaft, respectively.

8. The hybrid vehicle drive control apparatus according to claim 1, wherein the controller sets the target torque of the drive motor so that a present value of the battery state does not fall below the lowest limit value.

9. The hybrid vehicle drive control apparatus according to claim 1, wherein the battery state is a battery voltage.

10. A control method of a hybrid vehicle drive apparatus, comprising:
generating an electric current by an electric power generator mechanically connected to an engine;
driving a drive motor by at least one of the electric current generated by the electric power generator and an electric current supplied from a battery;
detecting a battery state of the battery;
calculating a lowest limit value of the battery state based on a rotating state of the electric power generator; and
setting a target torque of the drive motor based on the lowest limit value of the battery state.

11. The control method of claim 10, comprising:
calculating the lowest limit value of the battery state which does not cause the electric power generator to race.

12. The control method of claim 11, comprising:
calculating a maximum limit value of the target torque of the drive motor based on a difference between a present value of the battery state and the lowest limit value of the battery state; and
setting the target torque of the drive motor so as not to exceed the maximum limit value.

13. The control method of claim 11, comprising:
setting the target torque of the drive motor at such a value that a battery state can be maintained only by an electric power generated by the electric power generator.

14. The control method of claim 11, comprising:
calculating a correction value of the target torque of the drive motor based on a difference between a present value of the battery state and the lowest limit value of the battery state; and
correcting the target torque of the drive motor by the correction value.

15. The control method of claim 10, comprising:
calculating the lowest limit value of the battery state which at least allows the electric power generator to maintain a present rotational state.

16. The control method of claim 10, wherein the target torque of the drive motor is set so that a present value of the battery state does not fall below the lowest limit value.

17. The control method of claim 10, wherein the battery state is a battery voltage.

18. A computer readable memory medium for a hybrid vehicle drive apparatus including an electric power generator mechanically connected to an engine, a drive motor driven by at least one of an electric current generated by the electric power generator and an electric current supplied from a battery, and a detector that detects a battery state of the battery, the memory medium storing a program comprising:
instructions to calculate a lowest limit value of the battery state based on a rotating state of the electric power generator; and
instructions to set a target torque of the drive motor based on the lowest limit value of the battery state.

19. The computer readable memory medium of claim 18, the program further comprising:
instructions to calculate the lowest limit value of the battery state which does not cause the electric power generator to race.

20. The computer readable memory medium of claim 19, the program further comprising:
instructions to calculate a maximum limit value of the target torque of the drive motor based on a difference between a present value of the battery state and the lowest limit value of the battery state; and
instructions to correct the target torque of the drive motor so as not to exceed the maximum limit value.

21. The computer readable memory medium of claim 19, the program further comprising:
instructions to set the target torque of the drive motor at such a value that a battery state can be maintained only by an electric power generated by the electric power generator.

22. The computer readable memory medium of claim 19, the program further comprising:
instructions to calculate a correction value of the target torque of the drive motor based on a difference between a present value of the battery state and the lowest limit value of the battery state; and
instructions to correct the target torque of the drive motor by the correction value.

23. The computer readable memory medium of claim 18, the program further comprising:
instructions to calculate the lowest limit value of the battery state which at least allows the electric power generator to maintain a present rotational state.

24. The computer readable memory medium of claim 18, wherein the target torque of the drive motor is set so that a present value of the battery state does not fall below the lowest limit value.

25. The computer readable memory medium of claim 18, wherein the battery state is a battery voltage.

* * * * *